US012720234B2

(12) United States Patent
Ozawa et al.

(10) Patent No.: US 12,720,234 B2
(45) Date of Patent: Aug. 25, 2026

(54) PHOTODETECTION DEVICE AND PHOTODETECTION SYSTEM

(71) Applicant: SONY SEMICONDUCTOR SOLUTIONS CORPORATION, Kanagawa (JP)

(72) Inventors: Hideki Ozawa, Kanagawa (JP); Takafumi Takatsuka, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 533 days.

(21) Appl. No.: 18/260,627

(22) PCT Filed: Dec. 1, 2021

(86) PCT No.: PCT/JP2021/044114

§ 371 (c)(1),
(2) Date: Jul. 7, 2023

(87) PCT Pub. No.: WO2022/153700

PCT Pub. Date: Jul. 21, 2022

(65) Prior Publication Data

US 2024/0056700 A1 Feb. 15, 2024

(30) Foreign Application Priority Data

Jan. 18, 2021 (JP) ................................ 2021-005817

(51) Int. Cl.
*H04N 25/00* (2023.01)
*H04N 25/773* (2023.01)
*H04N 25/779* (2023.01)

(52) U.S. Cl.
CPC ......... *H04N 25/773* (2023.01); *H04N 25/779* (2023.01)

(58) Field of Classification Search
USPC ........................................................ 356/4.01
See application file for complete search history.

(56) References Cited

U.S. PATENT DOCUMENTS 8,872,089 B2 * 10/2014 Korekado ............ H03M 1/123 341/126
10,598,787 B2 * 3/2020 Mattioli Della Rocca ................. G01S 17/32

(Continued)

FOREIGN PATENT DOCUMENTS

JP 01-184405 A 7/1989
JP 2011-217206 A 10/2011
JP 2018-077143 A 5/2018

OTHER PUBLICATIONS

International Search Report and Written Opinion of PCT Application No. PCT/JP2021/044114, issued on Jan. 25, 2022, 09 pages of ISRWO.

*Primary Examiner* — James R Hulka
(74) *Attorney, Agent, or Firm* — CHIP LAW GROUP

(57) ABSTRACT

A photodetection device according to the present disclosure includes: a light-receiving section that includes a light-receiving element, and generates a pulse signal including a pulse corresponding to a result of light reception by the light-receiving element; a plurality of switches that is each turned on or off on the basis of a corresponding control signal of a plurality of control signals, and each transmits the pulse signal by being turned on in a pulse period of the corresponding control signal of the plurality of control signals; a plurality of counters that is provided corresponding to the plurality of switches, and each performs counting processing on the basis of the pulse signal supplied through a corresponding switch of the plurality of switches to generate a first count value; and a signal generator that generates the plurality of control signals in a detection (Continued)

period to sequentially shift the respective pulse periods of the plurality of control signals by a unit period having a shorter time length than the pulse period.

15 Claims, 30 Drawing Sheets

(56) References Cited

U.S. PATENT DOCUMENTS 10,775,502 B2 * 9/2020 Ichikawa ................ G01S 17/32
11,119,213 B2 * 9/2021 Bradford ............... G01S 7/4911
11,585,937 B2 * 2/2023 Ronchini Ximenes ...................... G06T 19/20
11,789,131 B1 * 10/2023 Bohannon ............... G01S 17/34 356/5.09
11,867,814 B1 * 1/2024 Bohannon ............... G01S 17/89
11,914,038 B2 * 2/2024 Bradford ................. G01S 17/88
2006/0103472 A1 * 5/2006 Fukuda ..................... H03F 3/08 330/308
2008/0007640 A1 * 1/2008 Fuchikami ........... H04N 25/771 348/E3.018
2011/0317726 A1 * 12/2011 Tamaoki ............... H01S 3/1001 372/25
2013/0020471 A1 * 1/2013 Korekado ............. H03M 1/123 250/206
2016/0226219 A1 * 8/2016 Caillaud ............. H01S 5/02407
2017/0207257 A1 * 7/2017 Nishihara ........... H10F 39/8033
2018/0128919 A1 * 5/2018 Ichikawa ................ G01S 17/10
2018/0128921 A1 5/2018 Rocca et al.
2020/0271784 A1 * 8/2020 Bradford ................. G01S 7/486
2020/0319344 A1 10/2020 Ximenes et al.
2021/0021778 A1 * 1/2021 Bairo ..................... H04N 25/75
2021/0160413 A1 * 5/2021 Mochizuki ............. H04N 25/77
2022/0046197 A1 * 2/2022 Moue ....................... H03K 5/22
2022/0146675 A1 * 5/2022 Bradford ................. G01S 17/88
2022/0150437 A1 * 5/2022 Oosako ................... H03M 1/56
2023/0319447 A1 * 10/2023 Minoofar ........... H04Q 11/0005 398/58
2024/0027873 A1 * 1/2024 Antanavicius .......... G02F 1/392

* cited by examiner

[ FIG. 1 ]
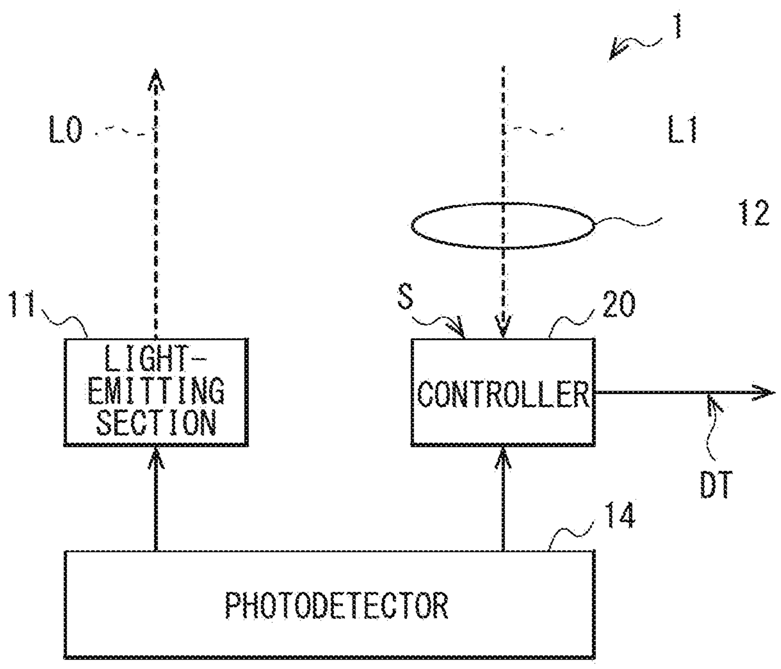
[ FIG. 2 ]
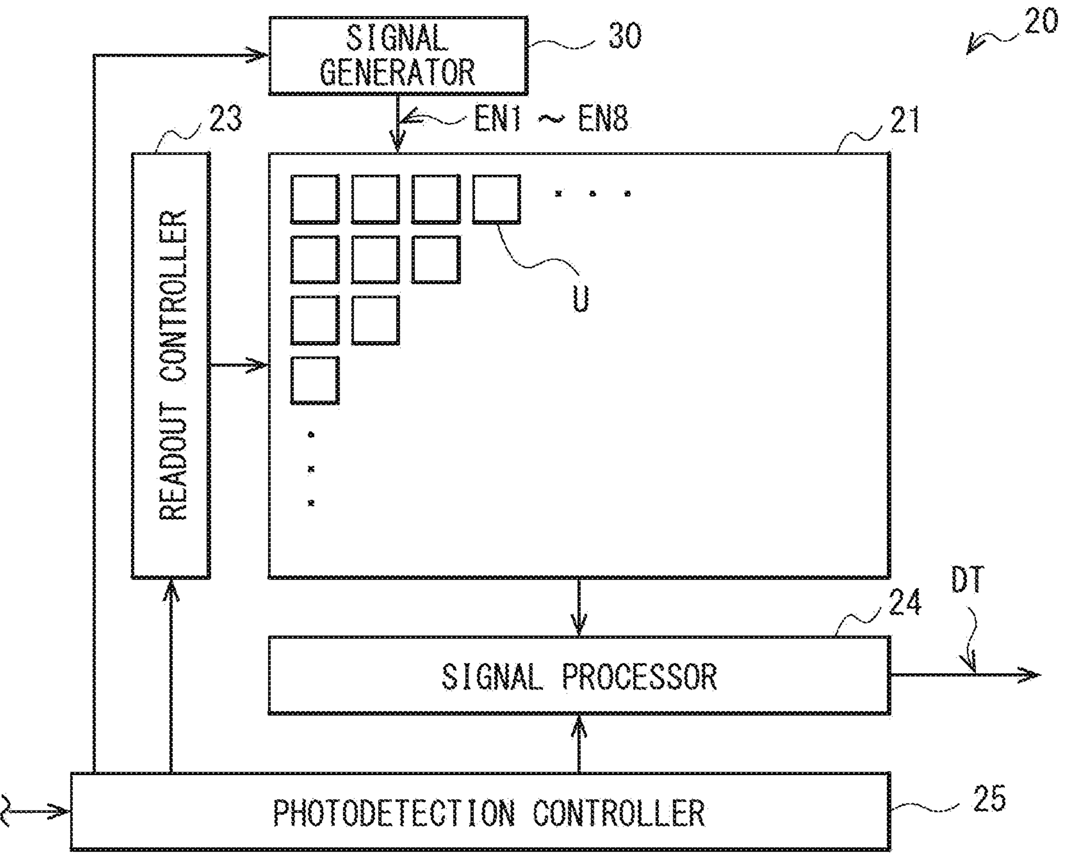

[ FIG. 3 ]
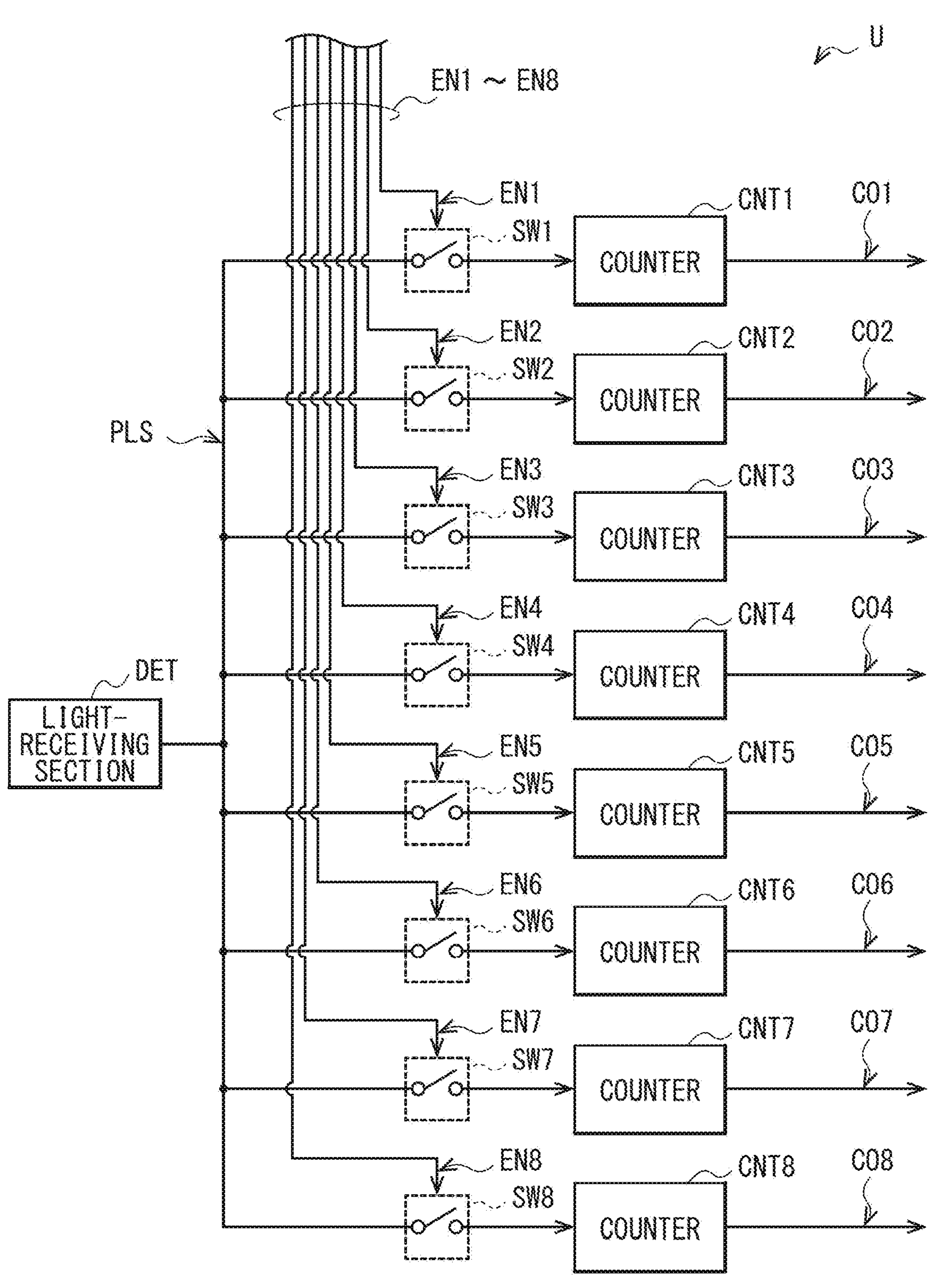

[ FIG. 4A ]
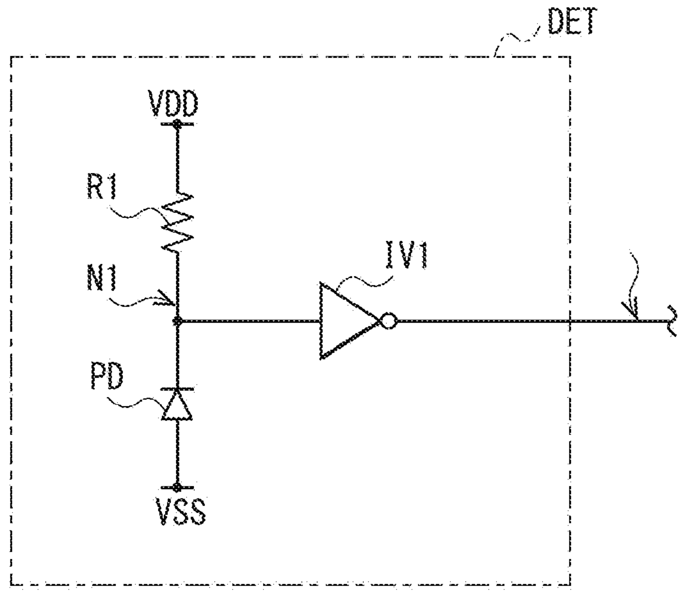
[ FIG. 4B ]
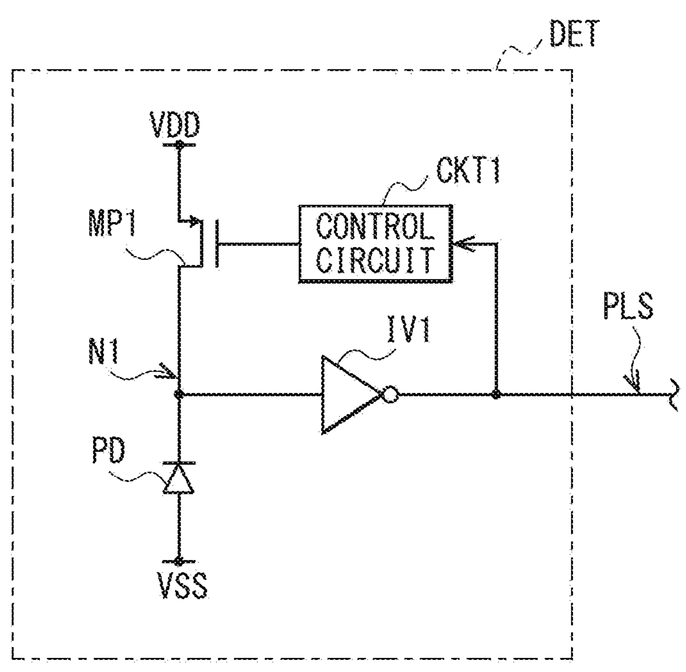

[ FIG. 5 ]
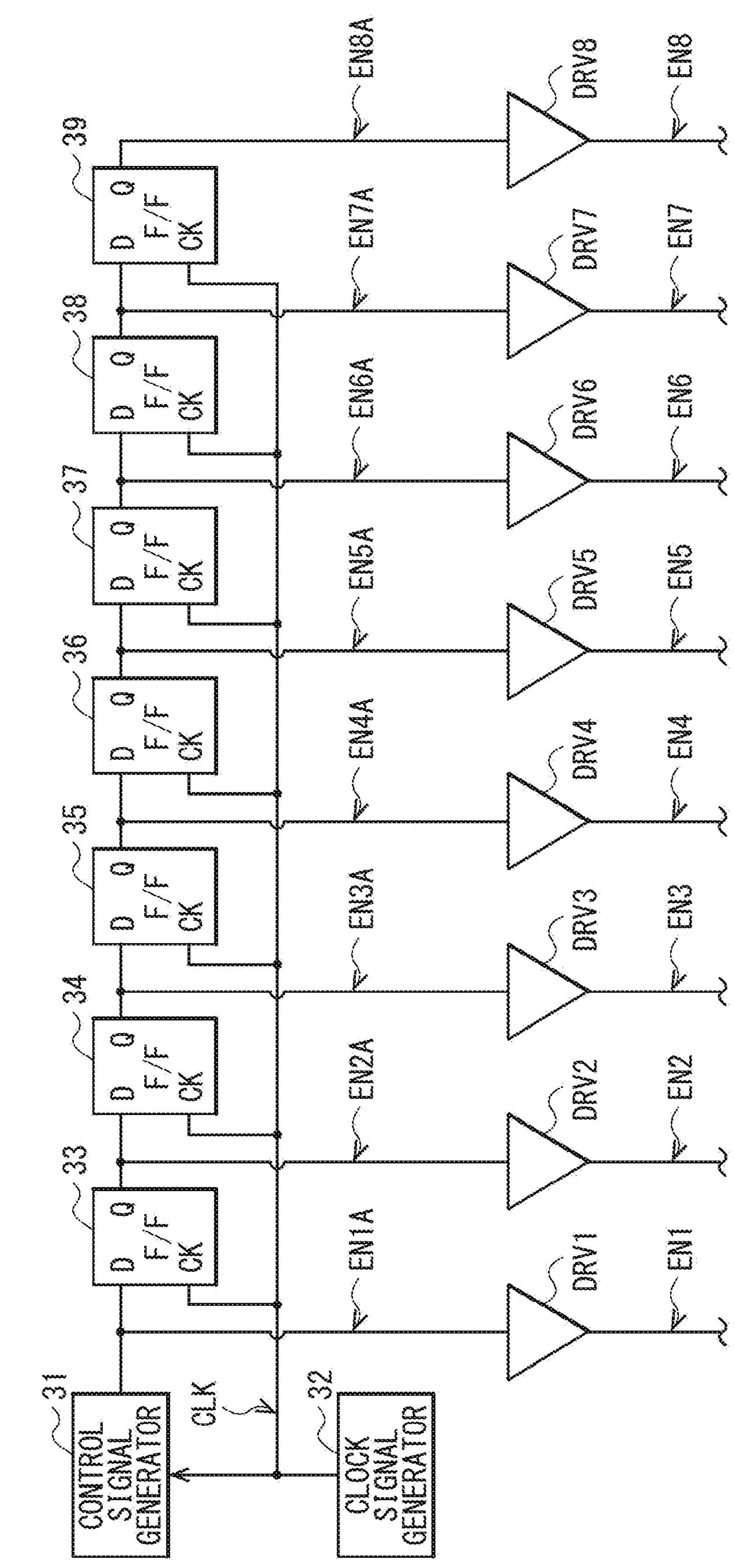

[FIG. 6]
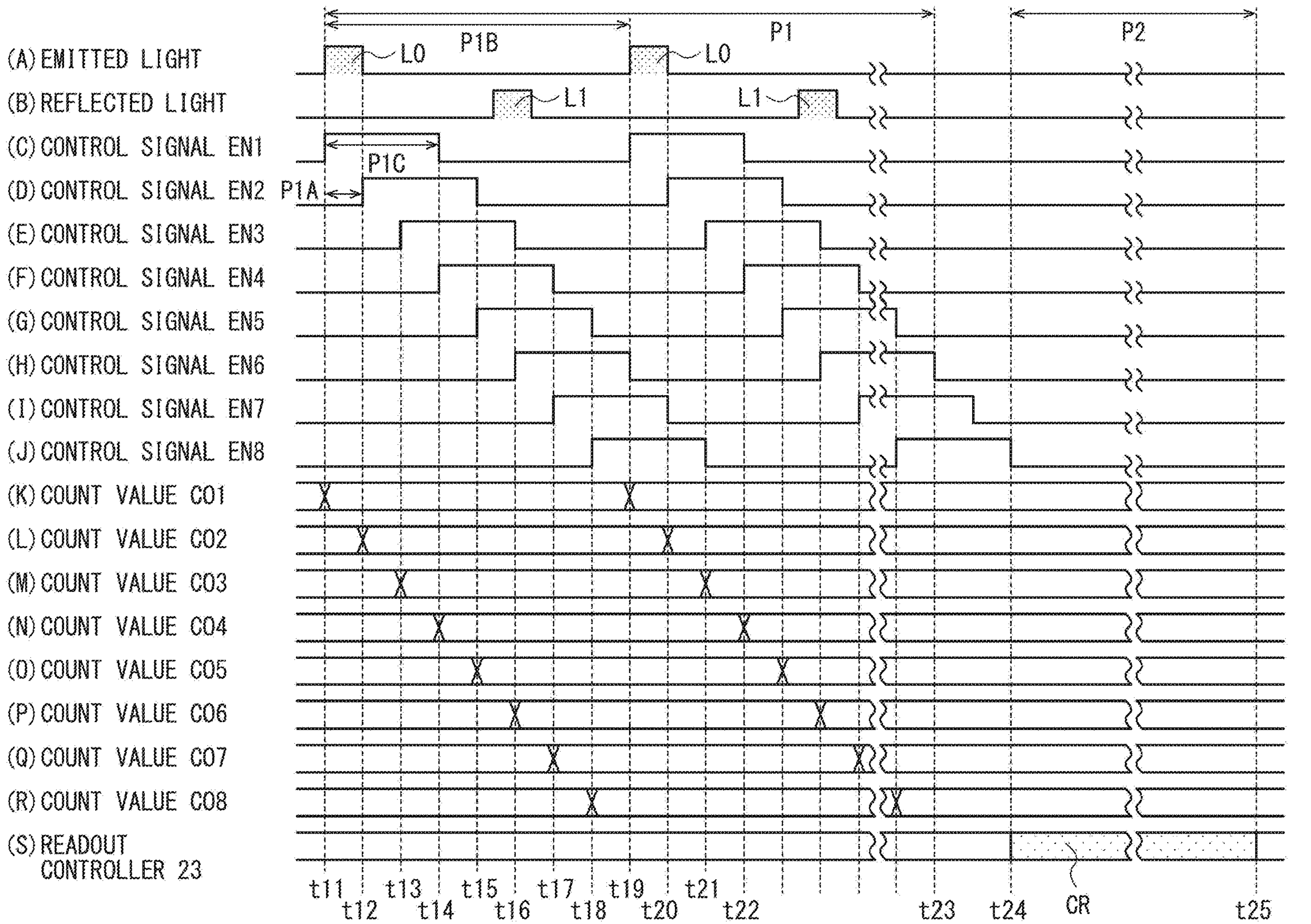

[ FIG. 7 ]
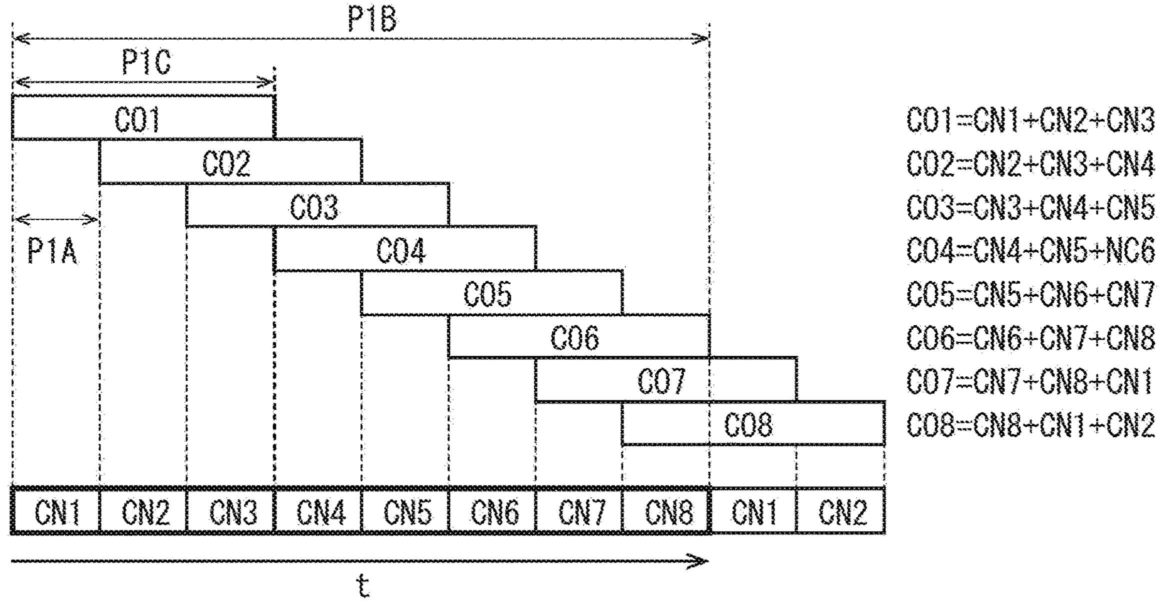
[ FIG. 8 ]
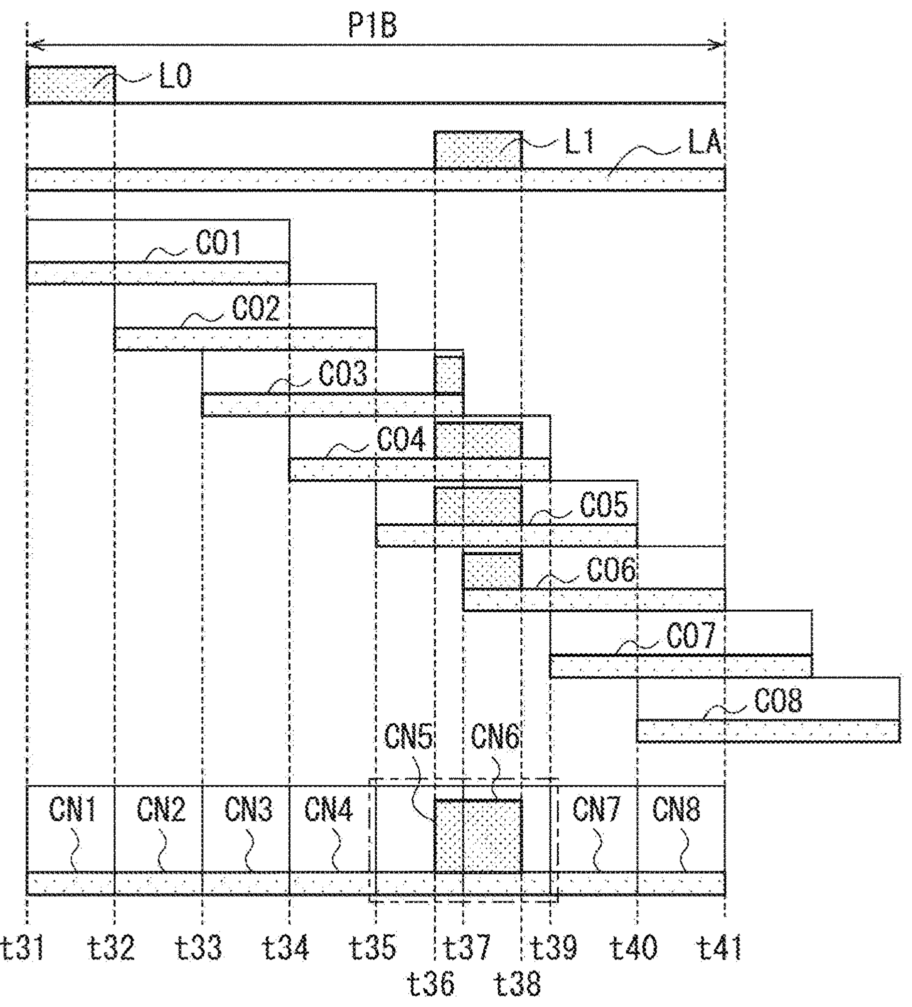

[ FIG. 9 ]
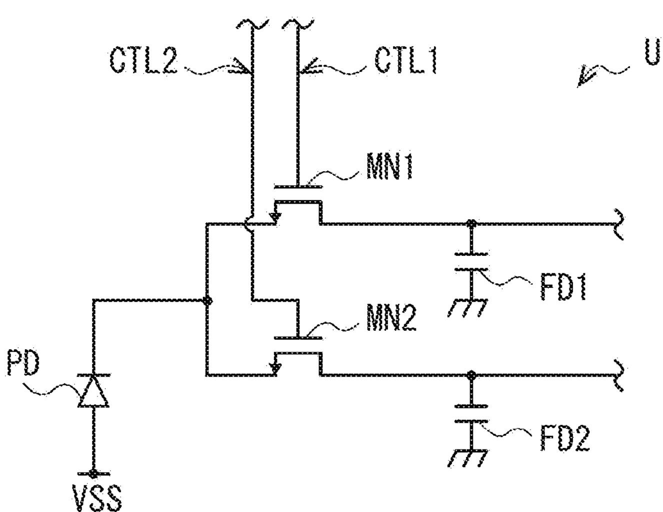
[ FIG. 10 ]
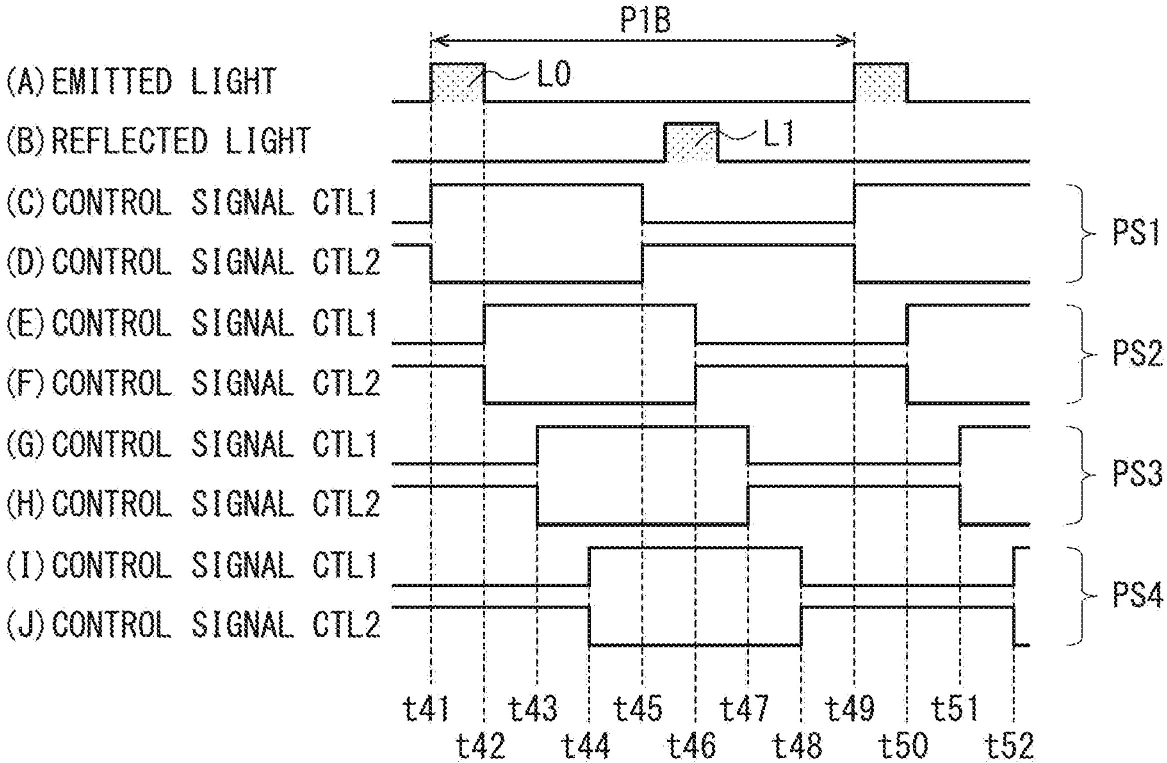

[ FIG. 11 ]
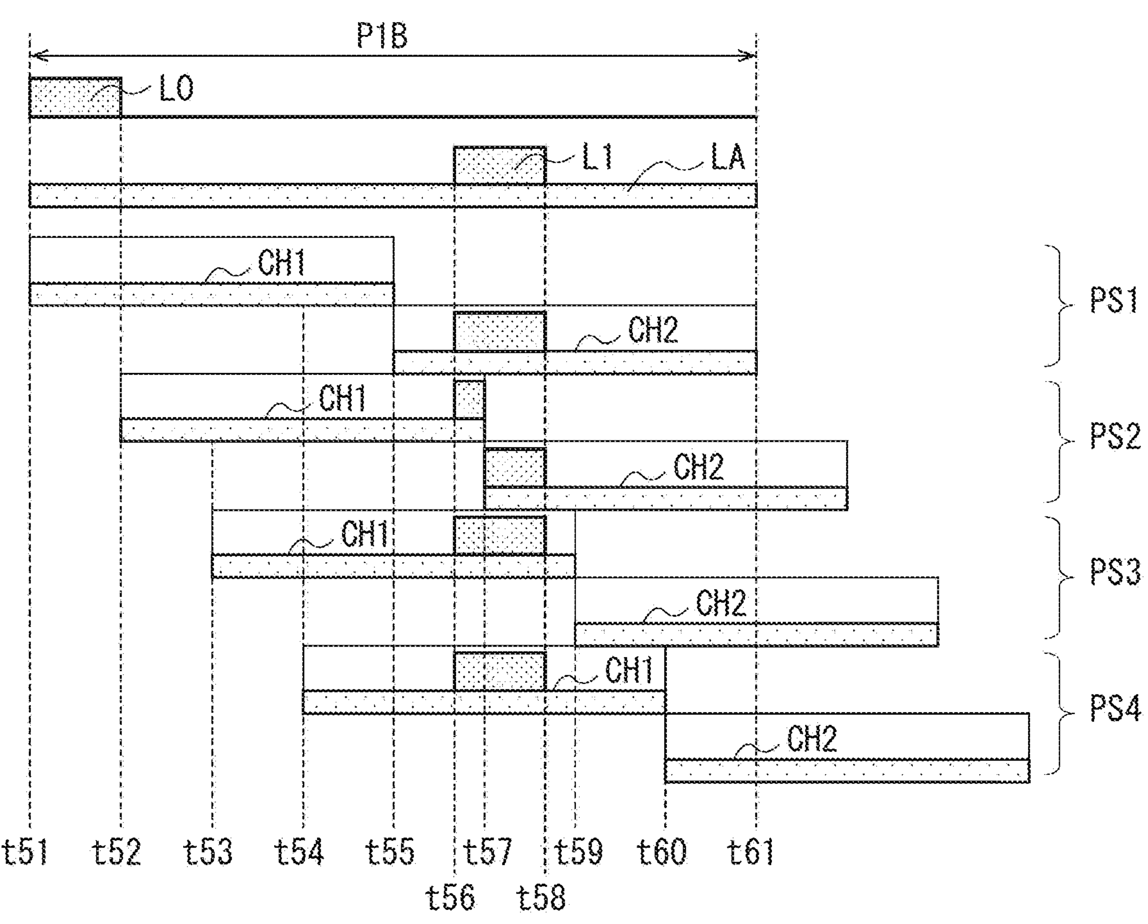

[ FIG. 12 ]
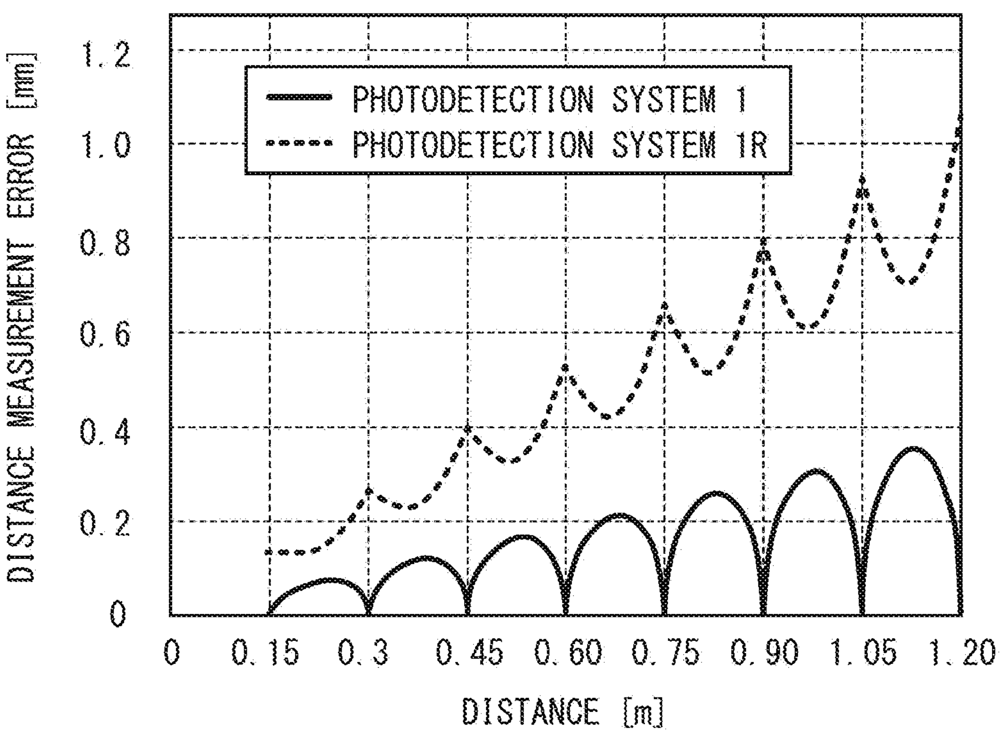
[ FIG. 13 ]
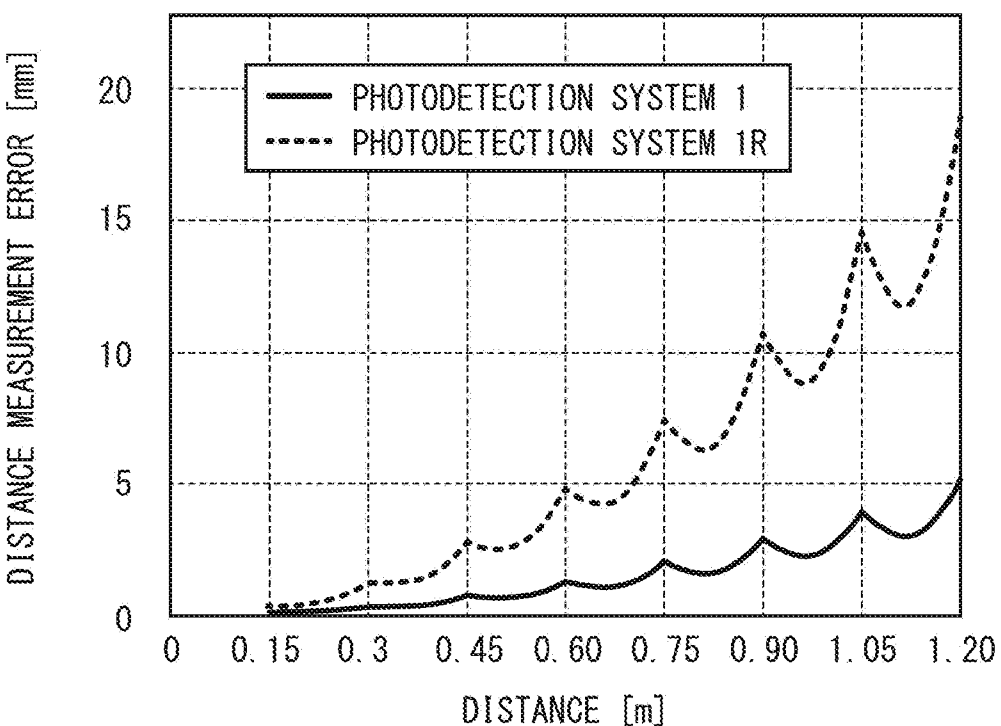

[ FIG. 14 ]
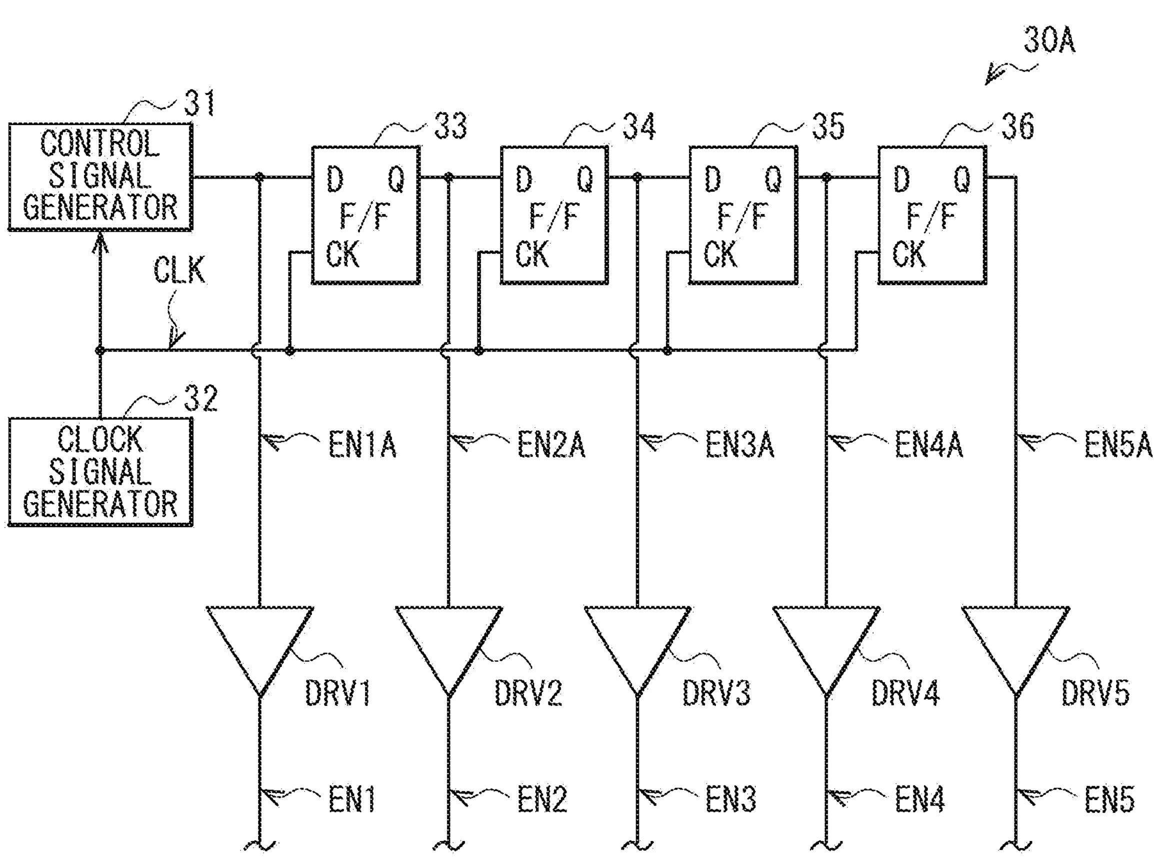

[ FIG. 15 ]
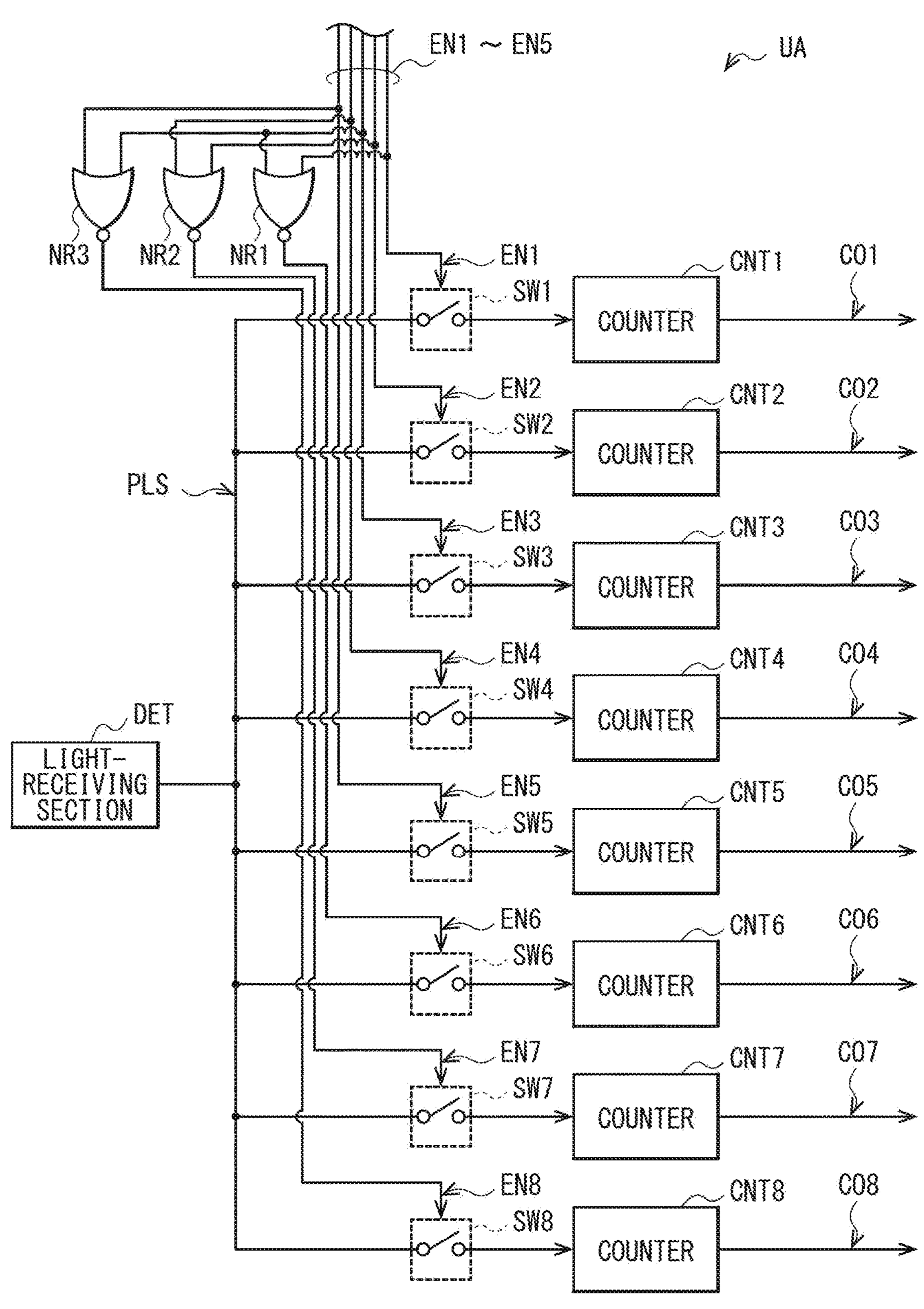

[ FIG. 16 ]
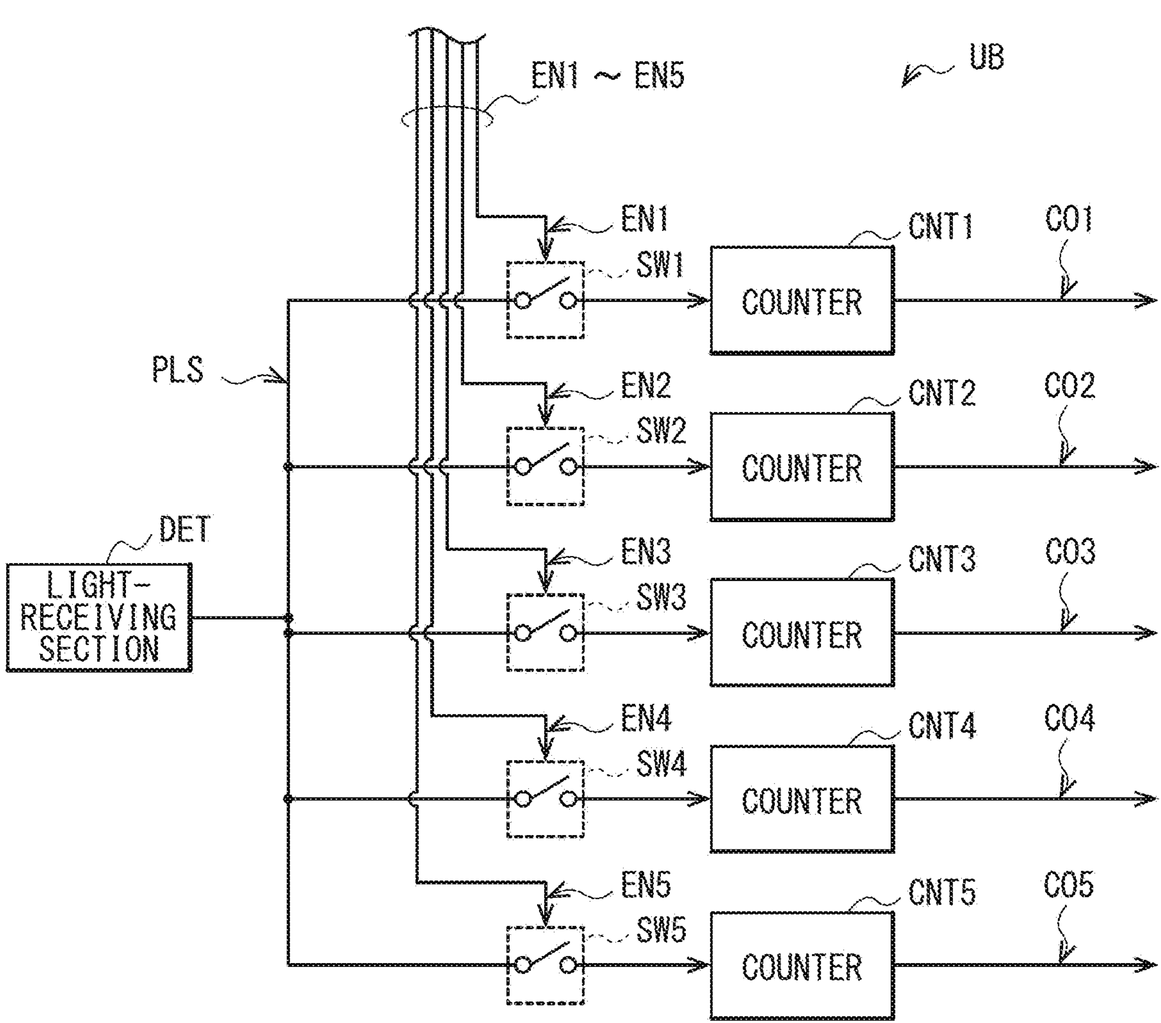

[ FIG. 17 ]
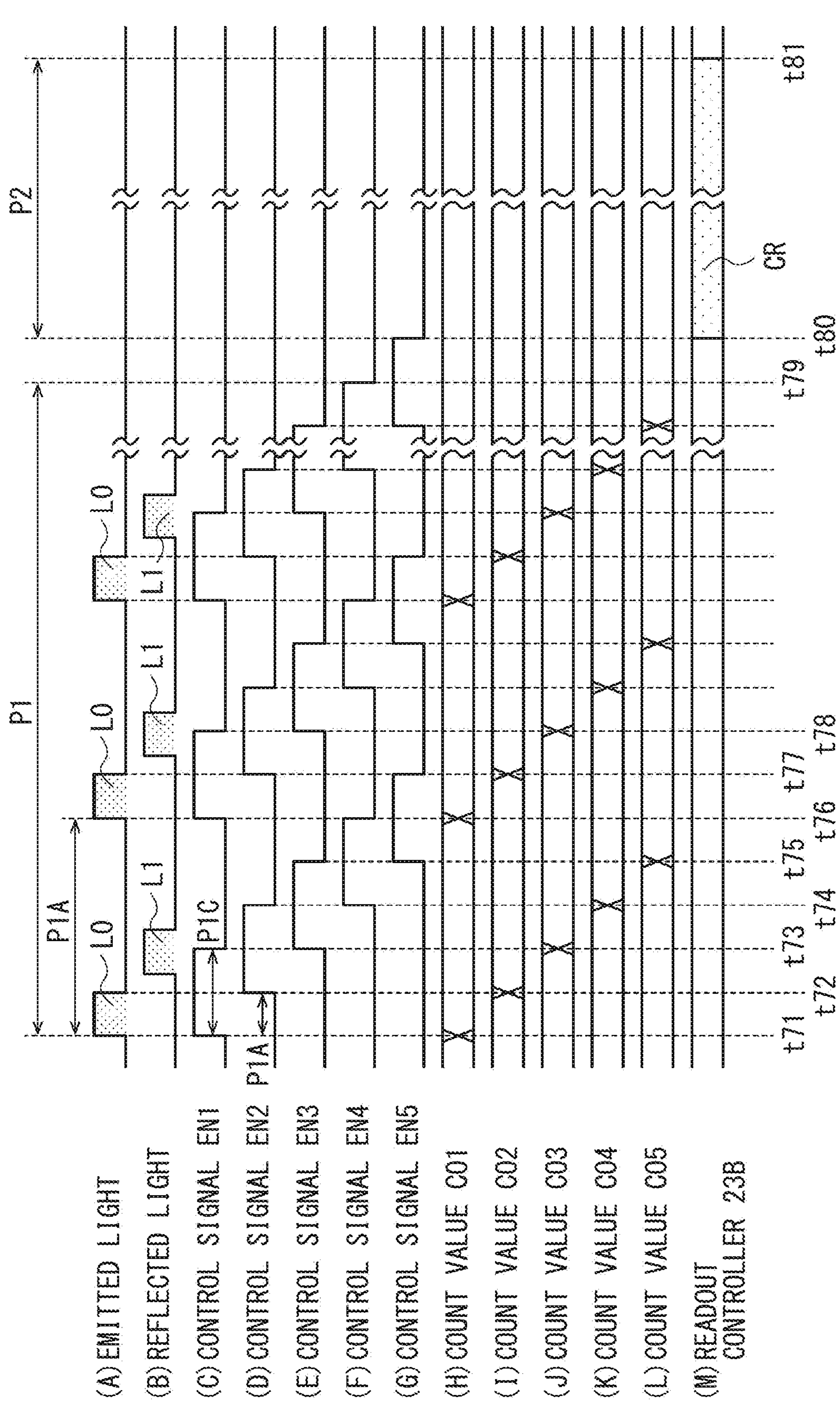

[ FIG. 18 ]
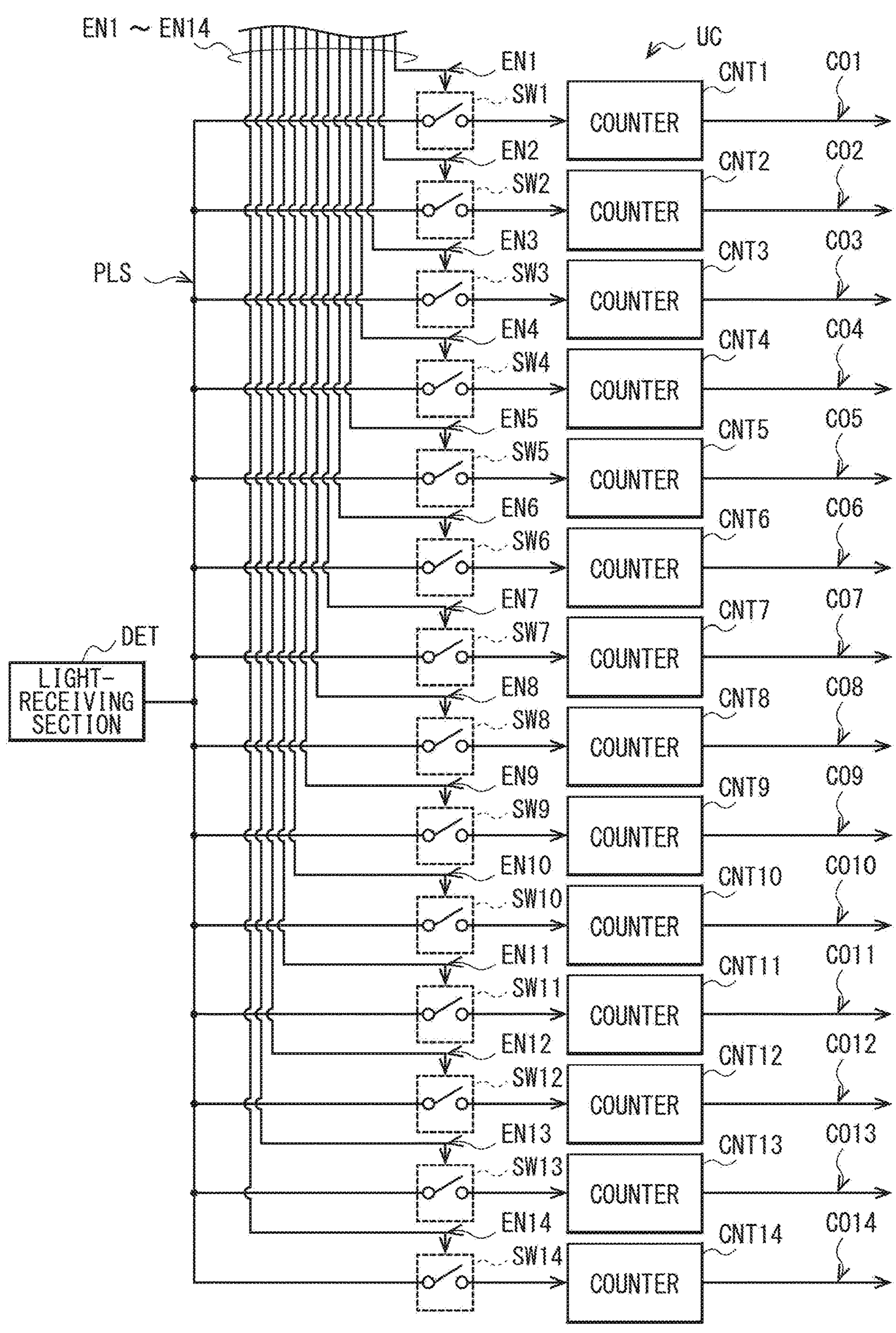

[FIG. 19]
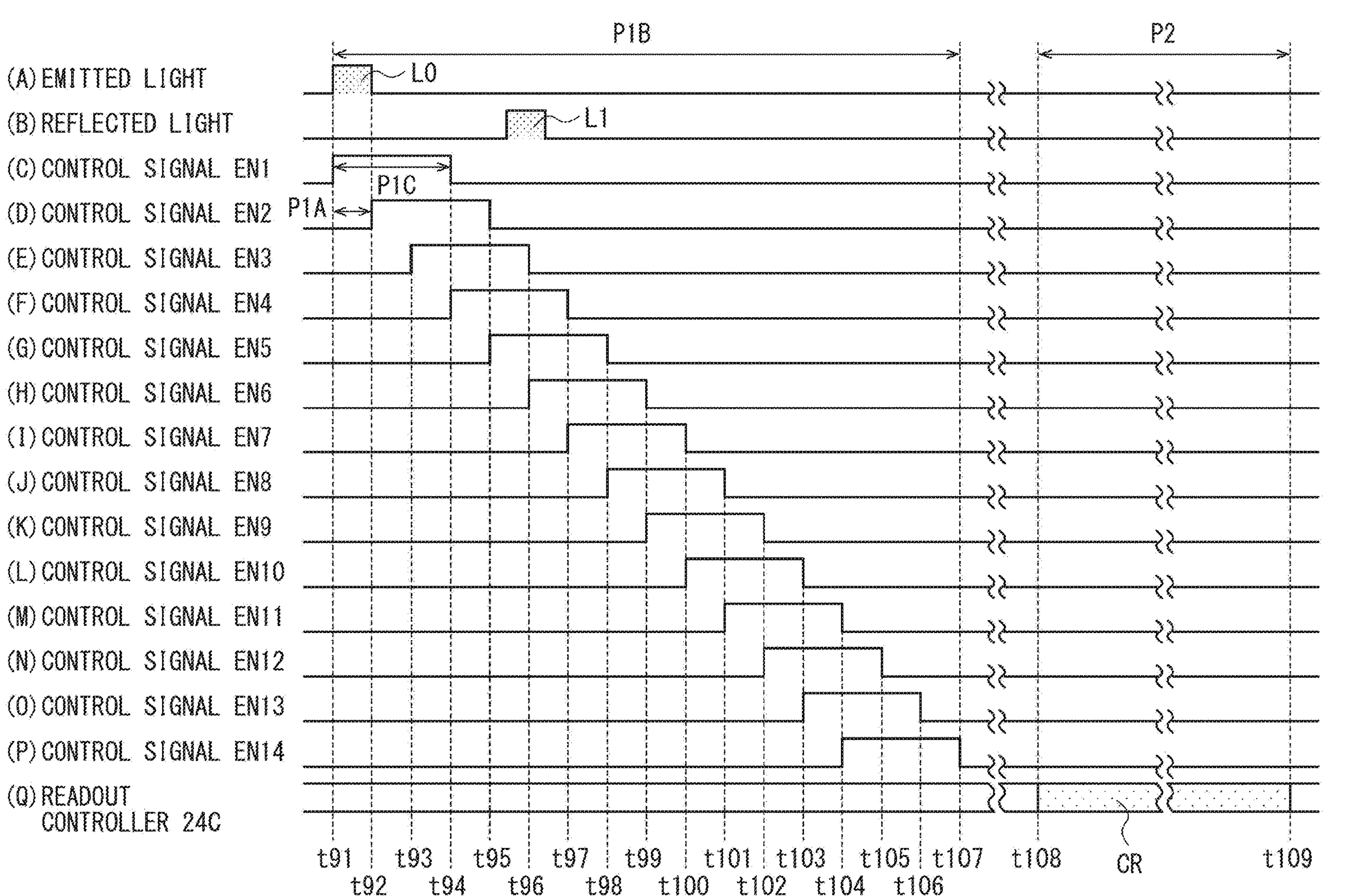

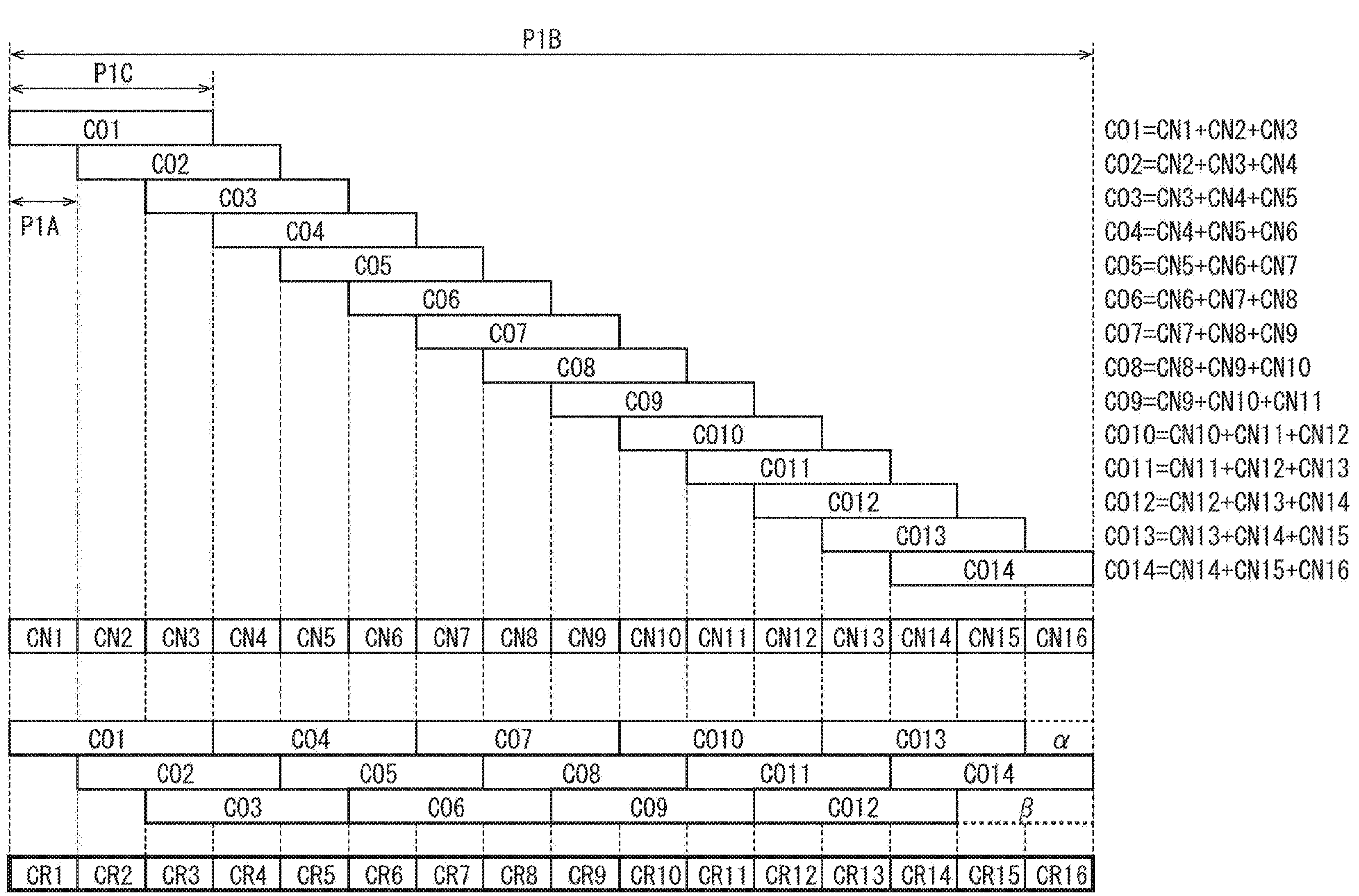
[ FIG. 20 ]
P1B
P1C
P1A
CO1
CO2
CO3
CO4
CO5
CO6
CO7
CO8
CO9
CO10
CO11
CO12
CO13
CO14
CO1=CN1+CN2+CN3
CO2=CN2+CN3+CN4
CO3=CN3+CN4+CN5
CO4=CN4+CN5+CN6
CO5=CN5+CN6+CN7
CO6=CN6+CN7+CN8
CO7=CN7+CN8+CN9
CO8=CN8+CN9+CN10
CO9=CN9+CN10+CN11
CO10=CN10+CN11+CN12
CO11=CN11+CN12+CN13
CO12=CN12+CN13+CN14
CO13=CN13+CN14+CN15
CO14=CN14+CN15+CN16
CN1
CN2
CN3
CN4
CN5
CN6
CN7
CN8
CN9
CN10
CN11
CN12
CN13
CN14
CN15
CN16
α
β
CR1
CR2
CR3
CR4
CR5
CR6
CR7
CR8
CR9
CR10
CR11
CR12
CR13
CR14
CR15
CR16

[ FIG. 21 ]

| | REPRESENTATION USING CO1 TO CO14, $\alpha$, AND $\beta$ | REPRESENTATION USING CN1 TO CN16 |
|---|---|---|
| CR1 | $(CO1 + CO4 + CO7 + CO10 + CO13 + \alpha) - (CO2 + CO5 + CO8 + CO11 + CO14)$ | $CN1 + \frac{CN14 + CN15 - 2 \times CN16}{3}$ |
| CR2 | $(CO2 + CO5 + CO8 + CO11 + CO14) - (CO3 + CO6 + CO9 + CO12 + \beta)$ | $CN2 + \frac{-2 \times CN14 + CN15 + CN16}{3}$ |
| CR3 | $(CO3 + CO6 + CO9 + CO12 + \beta) - (CO4 + CO7 + CO10 + CO13 + \alpha)$ | $CN3 + \frac{CN14 - 2 \times CN15 + CN16}{3}$ |
| CR4 | $(CO4 + CO7 + CO10 + CO13 + \alpha) - (CO5 + CO8 + CO11 + CO14)$ | $CN4 + \frac{CN14 + CN15 - 2 \times CN16}{3}$ |
| CR5 | $(CO5 + CO8 + CO11 + CO14) - (CO6 + CO9 + CO12 + \beta)$ | $CN5 + \frac{-2 \times CN14 + CN15 + CN16}{3}$ |
| CR6 | $(CO6 + CO9 + CO12 + \beta) - (CO7 + CO10 + CO13 + \alpha)$ | $CN6 + \frac{CN14 - 2 \times CN15 + CN16}{3}$ |

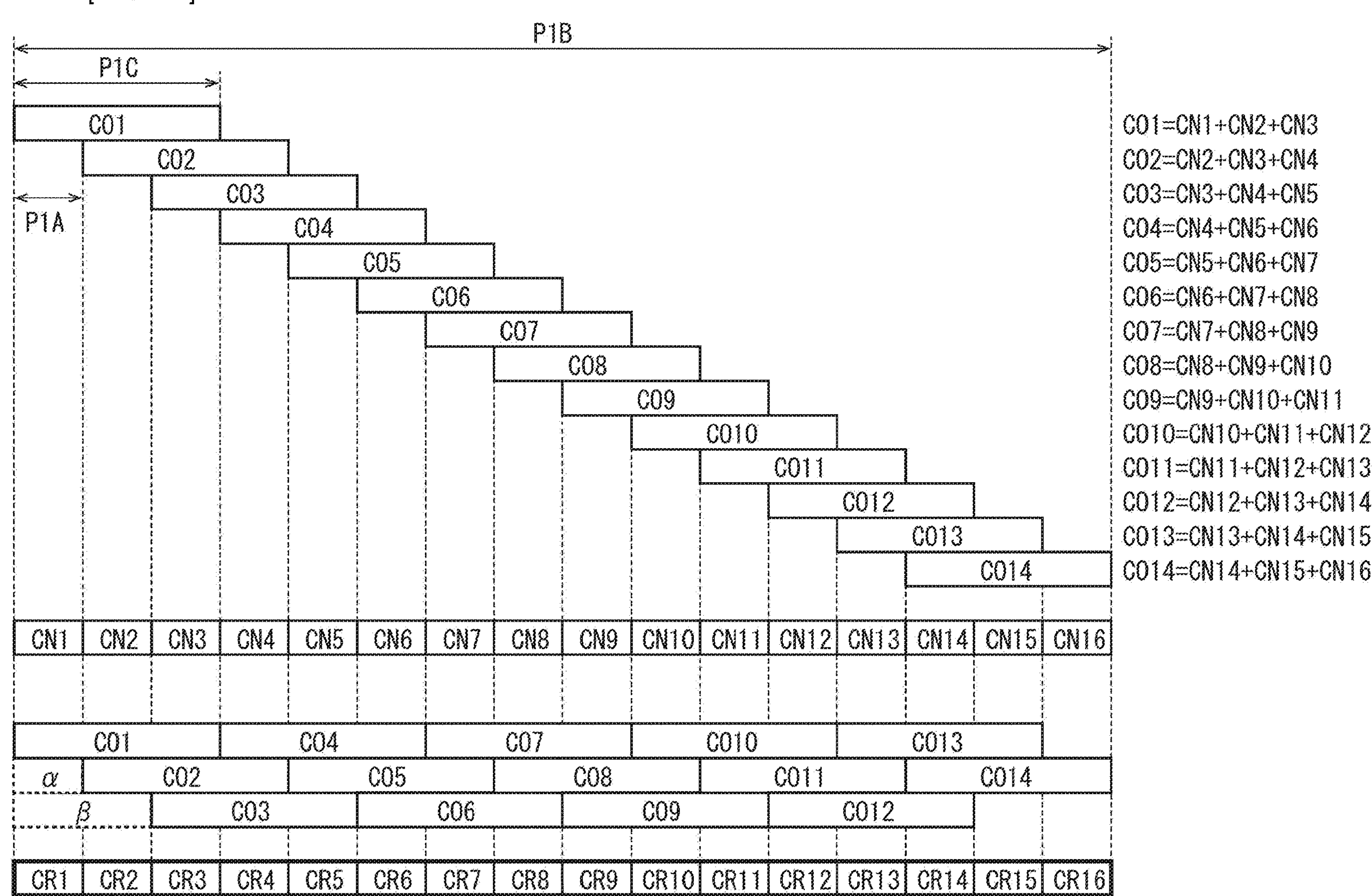
[ FIG. 22 ]
P1B
P1C
P1A
CO1=CN1+CN2+CN3
CO2=CN2+CN3+CN4
CO3=CN3+CN4+CN5
CO4=CN4+CN5+CN6
CO5=CN5+CN6+CN7
CO6=CN6+CN7+CN8
CO7=CN7+CN8+CN9
CO8=CN8+CN9+CN10
CO9=CN9+CN10+CN11
CO10=CN10+CN11+CN12
CO11=CN11+CN12+CN13
CO12=CN12+CN13+CN14
CO13=CN13+CN14+CN15
CO14=CN14+CN15+CN16
CN1 CN2 CN3 CN4 CN5 CN6 CN7 CN8 CN9 CN10 CN11 CN12 CN13 CN14 CN15 CN16
α
β
CR1 CR2 CR3 CR4 CR5 CR6 CR7 CR8 CR9 CR10 CR11 CR12 CR13 CR14 CR15 CR16

[ FIG. 23 ]

| | REPRESENTATION USING CO1 TO CO14, $\alpha$, AND $\beta$ | REPRESENTATION USING CN1 TO CN16 |
|---|---|---|
| CR16 | (CO14 + CO11 + CO8 + CO5 + CO2 + $\alpha$) − (CO13 + CO10 + CO7 + CO4 + CO1) | $CN16 + \frac{CN3 + CN2 - 2 \times CN1}{3}$ |
| CR15 | (CO13 + CO10 + CO7 + CO4 + CO1) − (CO12 + CO9 + CO6 + CO3 + $\beta$) | $CN15 + \frac{-2 \times CN3 + CN2 + CN1}{3}$ |
| CR14 | (CO12 + CO9 + CO6 + CO3 + $\beta$) − (CO11 + CO8 + CO5 + CO2 + $\alpha$) | $CN14 + \frac{CN3 - 2 \times CN2 + CN1}{3}$ |
| CR13 | (CO11 + CO8 + CO5 + CO2 + $\alpha$) − (CO10 + CO7 + CO4 + CO1) | $CN13 + \frac{CN3 + CN2 - 2 \times CN1}{3}$ |
| CR12 | (CO10 + CO7 + CO4 + CO1) − (CO9 + CO6 + CO3 + $\beta$) | $CN12 + \frac{-2 \times CN3 + CN2 + CN1}{3}$ |
| CR11 | (CO9 + CO6 + CO3 + $\beta$) − (CO8 + CO5 + CO2 + $\alpha$) | $CN11 + \frac{CN3 - 2 \times CN2 + CN1}{3}$ |

[ FIG. 24 ]
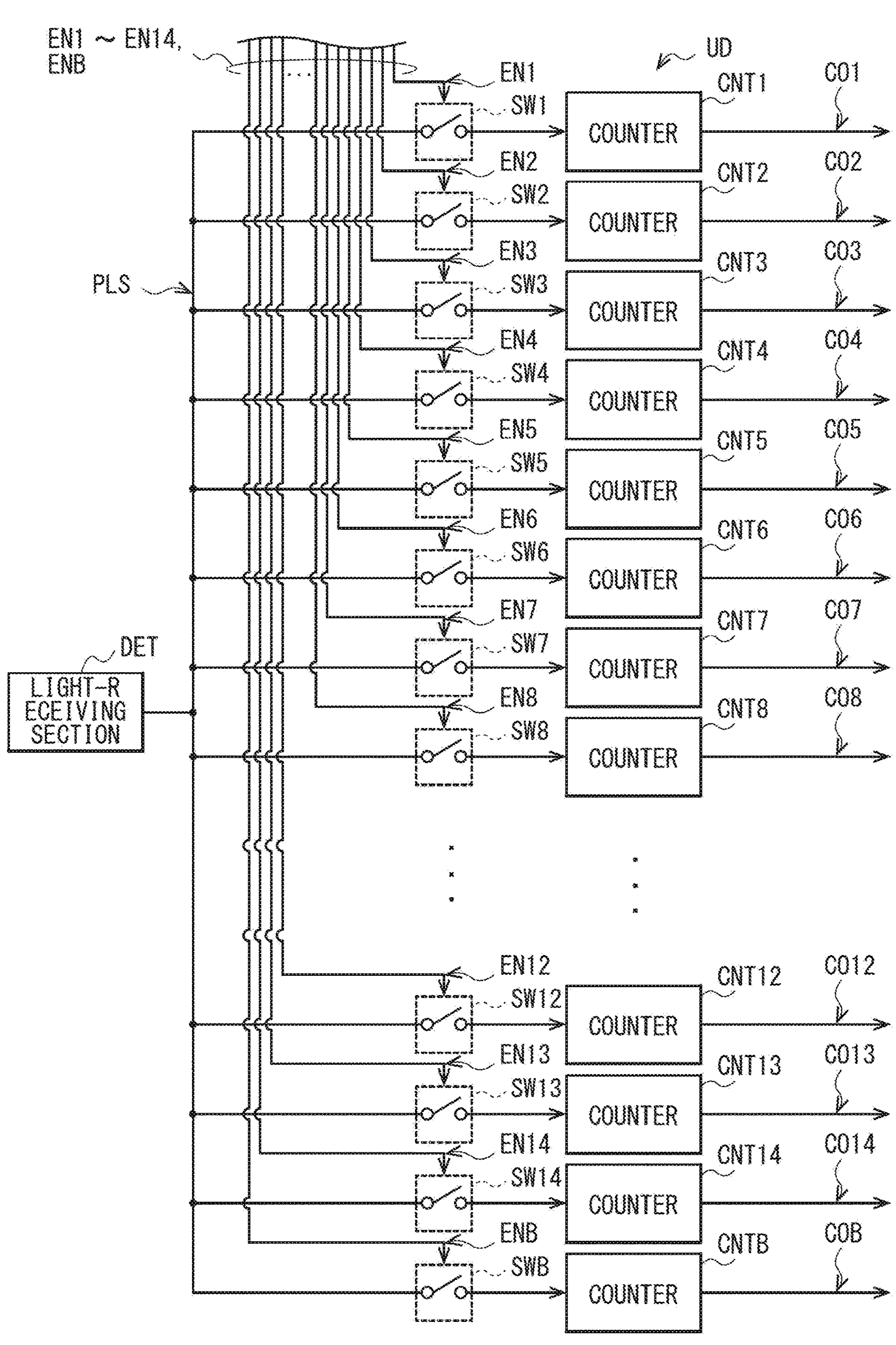

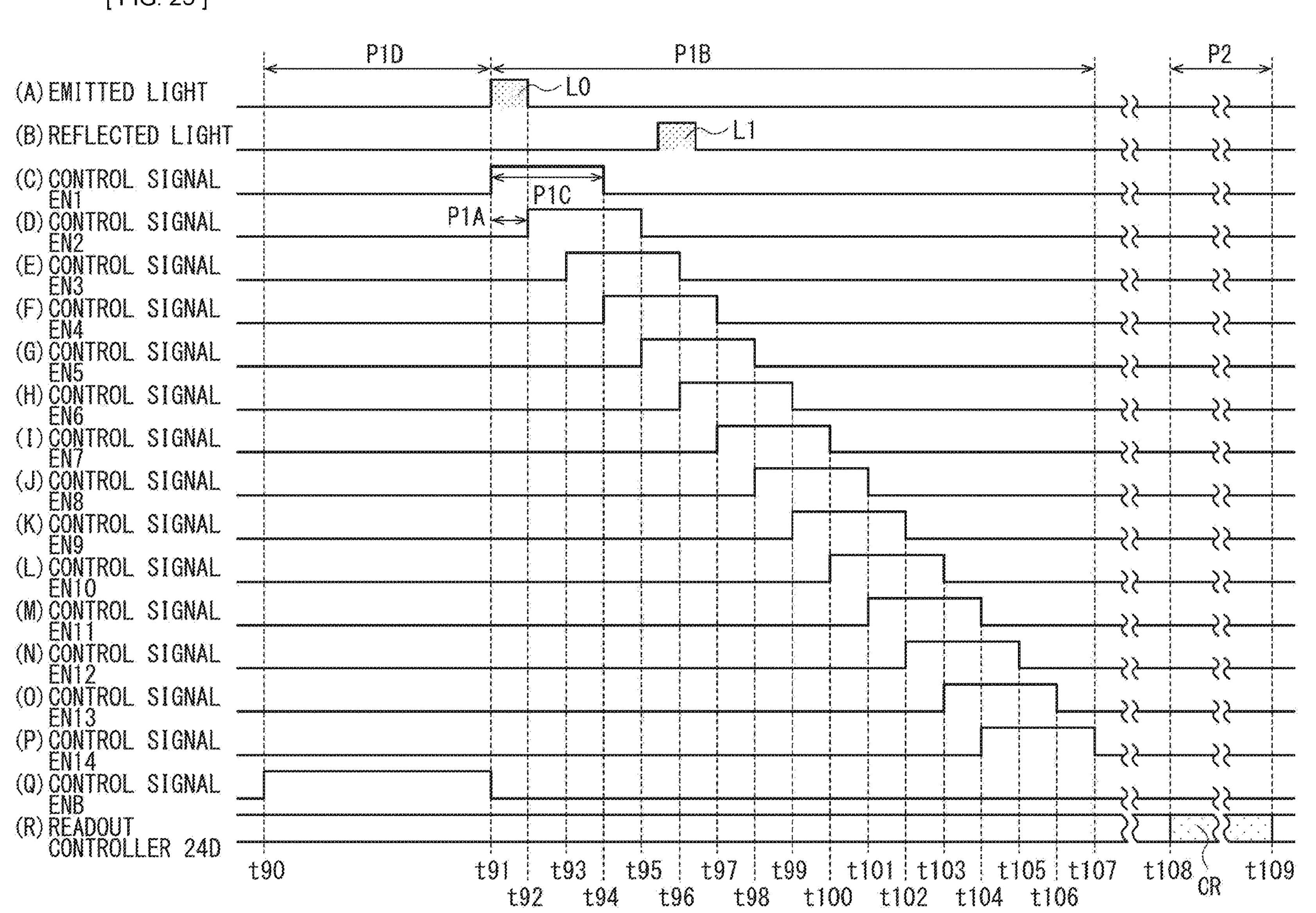
[FIG. 25]
P1D
P1B
P2
(A) EMITTED LIGHT
L0
(B) REFLECTED LIGHT
L1
(C) CONTROL SIGNAL EN1
P1C
(D) CONTROL SIGNAL EN2
P1A
(E) CONTROL SIGNAL EN3
(F) CONTROL SIGNAL EN4
(G) CONTROL SIGNAL EN5
(H) CONTROL SIGNAL EN6
(I) CONTROL SIGNAL EN7
(J) CONTROL SIGNAL EN8
(K) CONTROL SIGNAL EN9
(L) CONTROL SIGNAL EN10
(M) CONTROL SIGNAL EN11
(N) CONTROL SIGNAL EN12
(O) CONTROL SIGNAL EN13
(P) CONTROL SIGNAL EN14
(Q) CONTROL SIGNAL ENB
(R) READOUT CONTROLLER 24D
t90
t91
t92
t93
t94
t95
t96
t97
t98
t99
t100
t101
t102
t103
t104
t105
t106
t107
t108
CR
t109

[ FIG. 26 ]
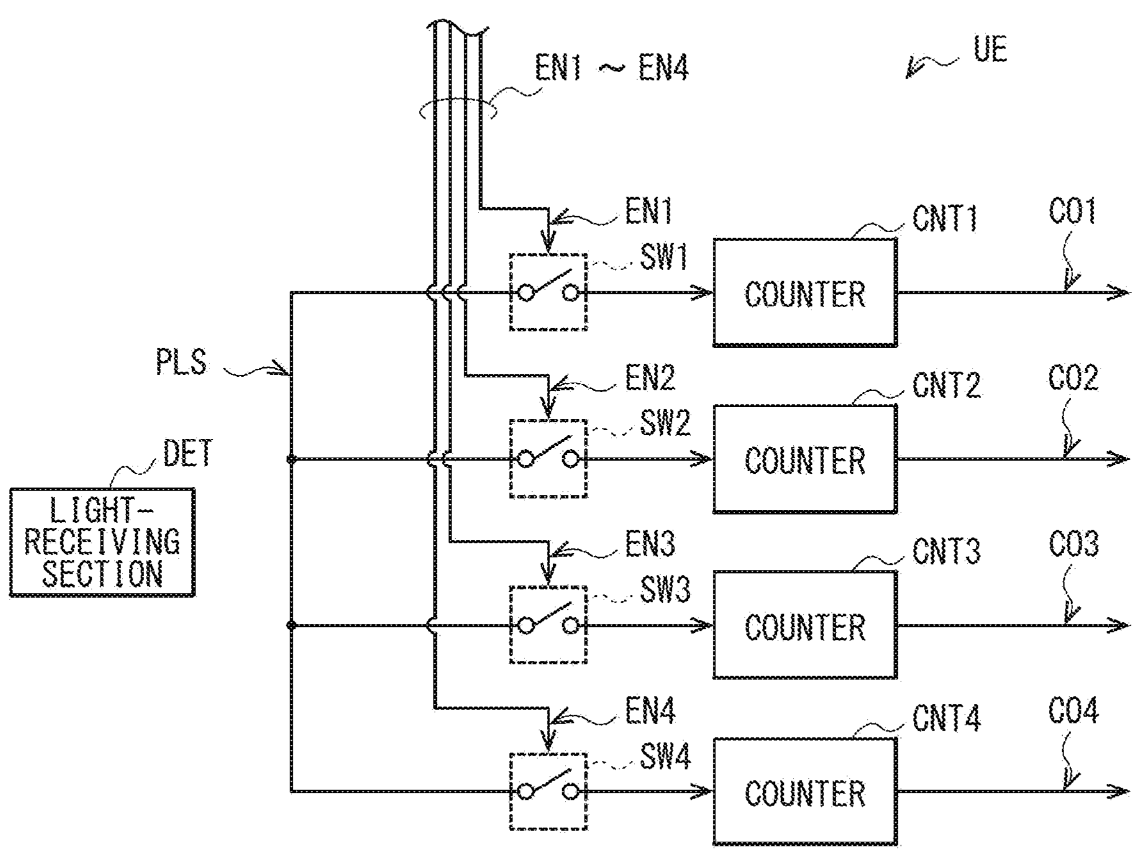

[ FIG. 27 ]
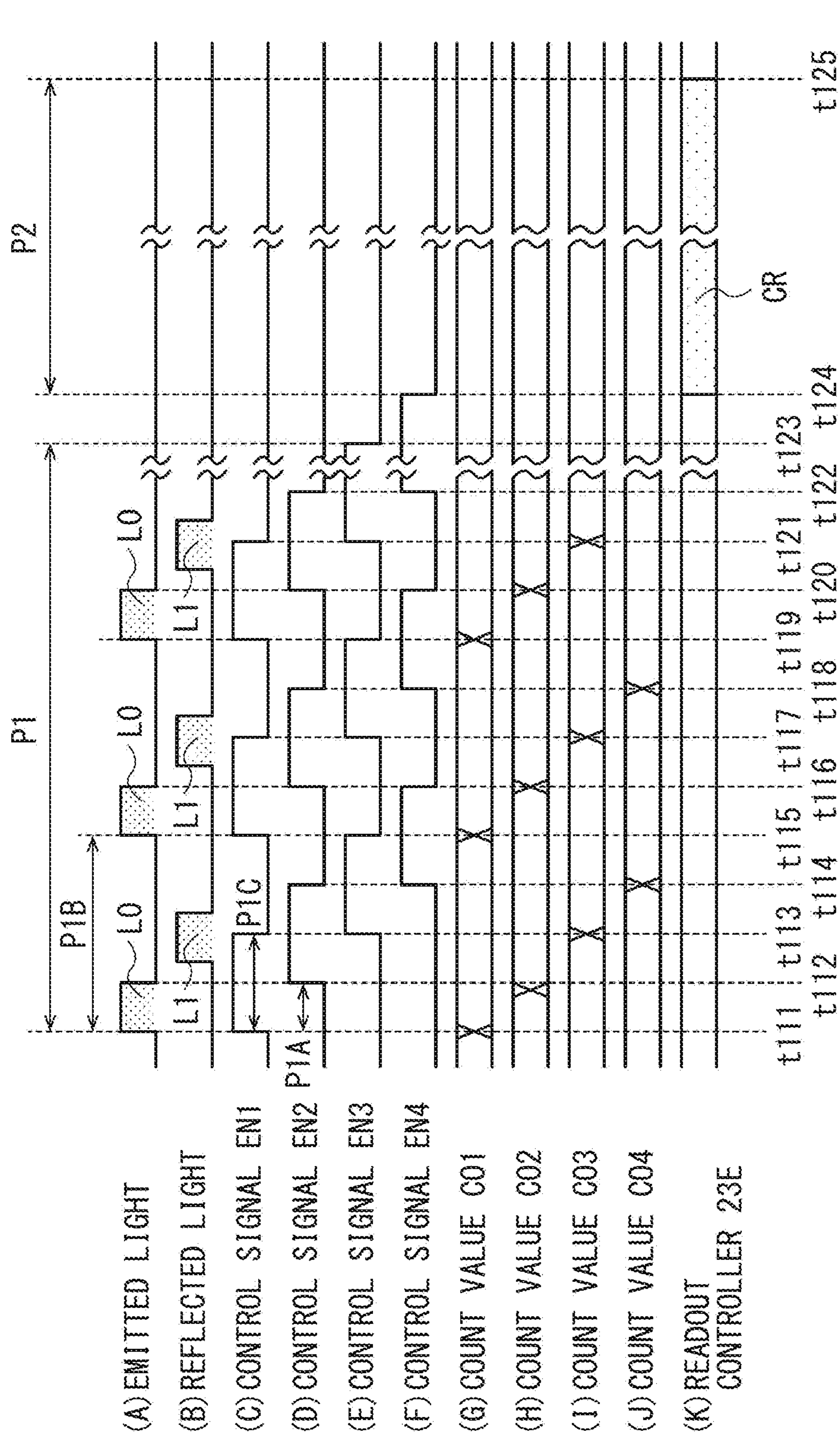

[ FIG. 28 ]
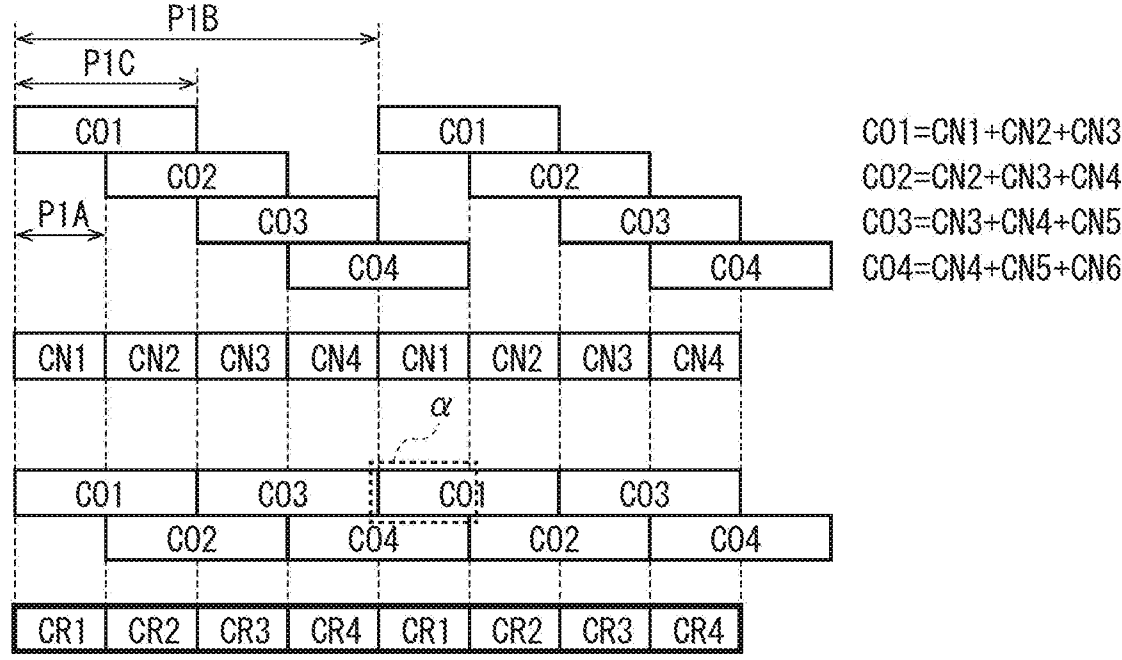
[ FIG. 29 ]
| | REPRESENTATION USING C01 TO C04 AND α |
|---|---|
| CR1 | (C01 + C03 + α) − (C02 + C04) |
| CR2 | (C02 + C04) − (C03 + α) |
| CR3 | (C03 + α) − (C04) |
| CR4 | α |

[ FIG. 30A ]
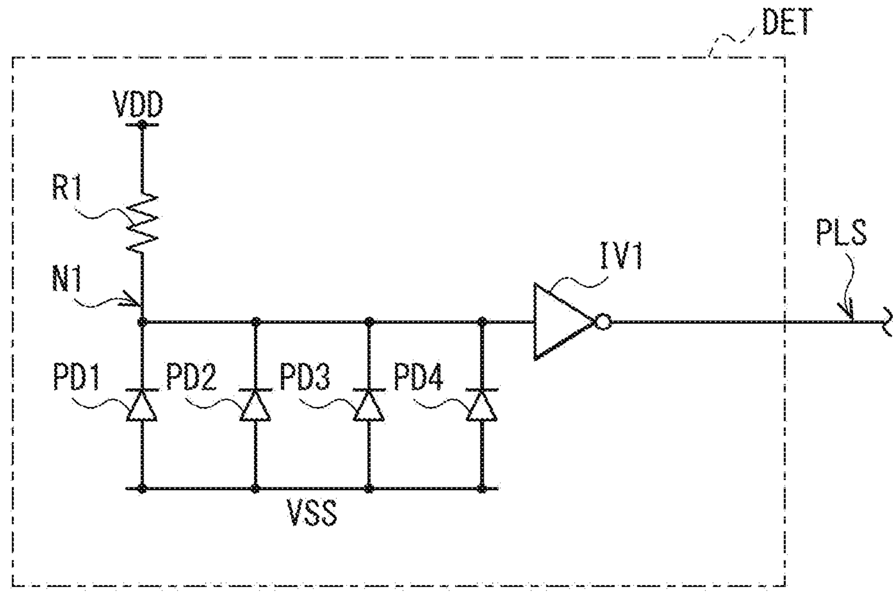
[ FIG. 30B ]
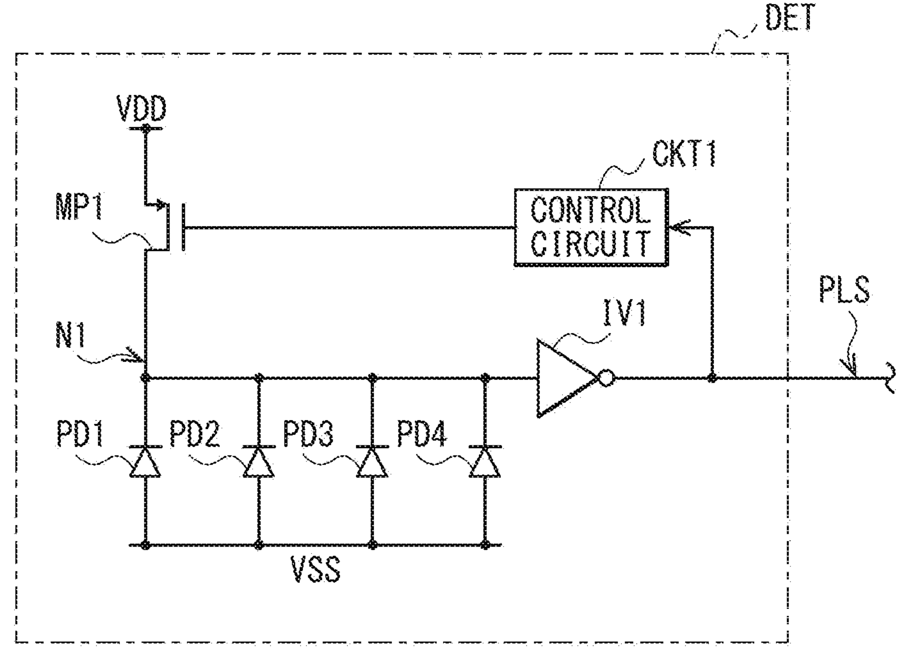

[ FIG. 31 ]
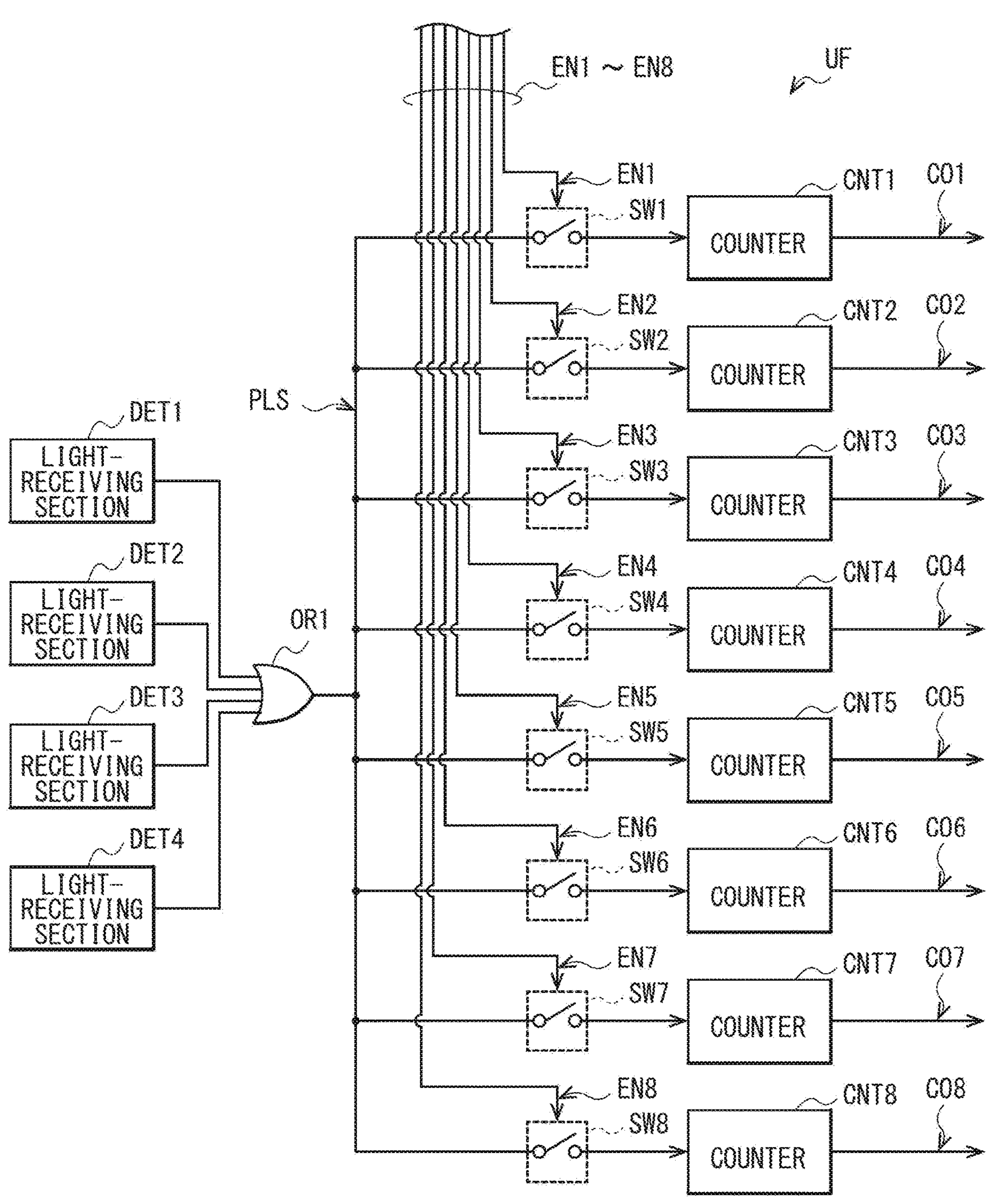

[ FIG. 32 ]
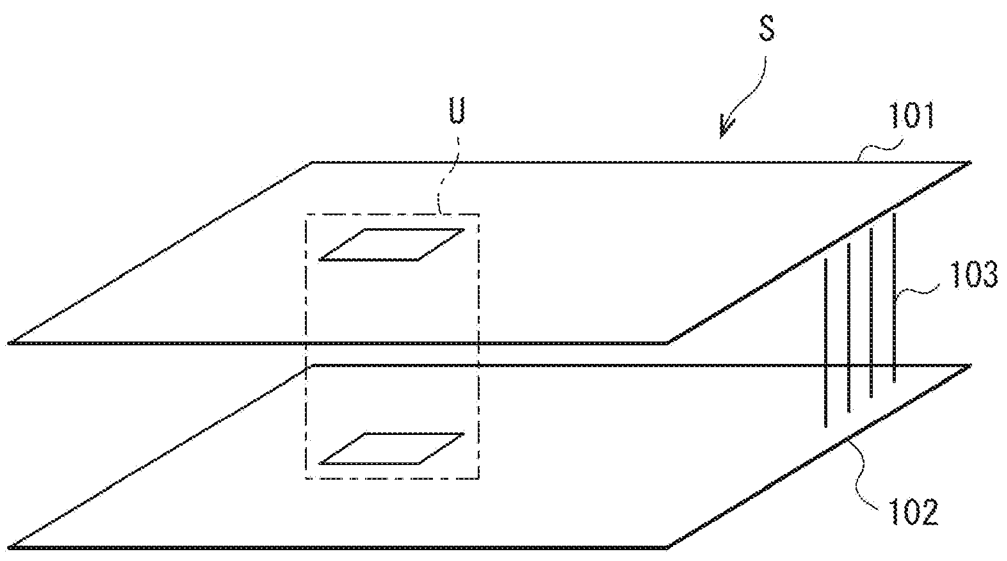
[ FIG. 33 ]
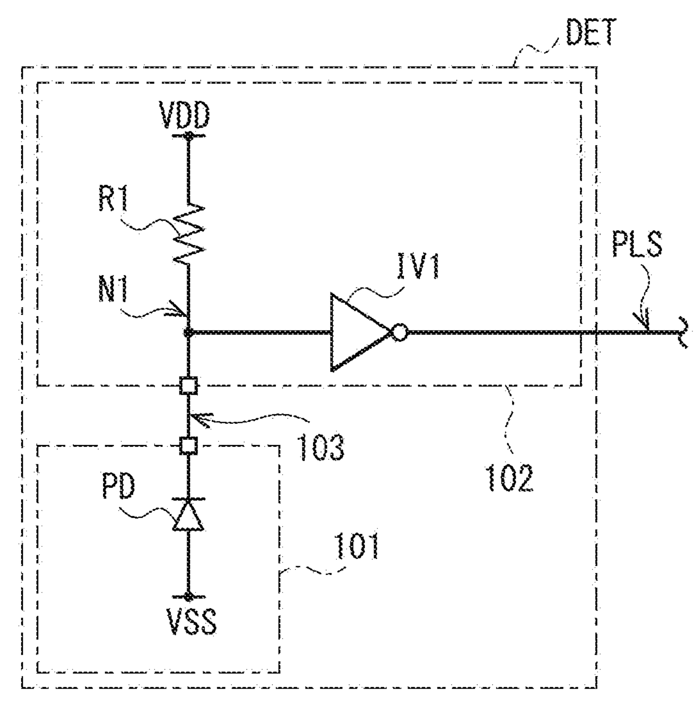

[ FIG. 34 ]
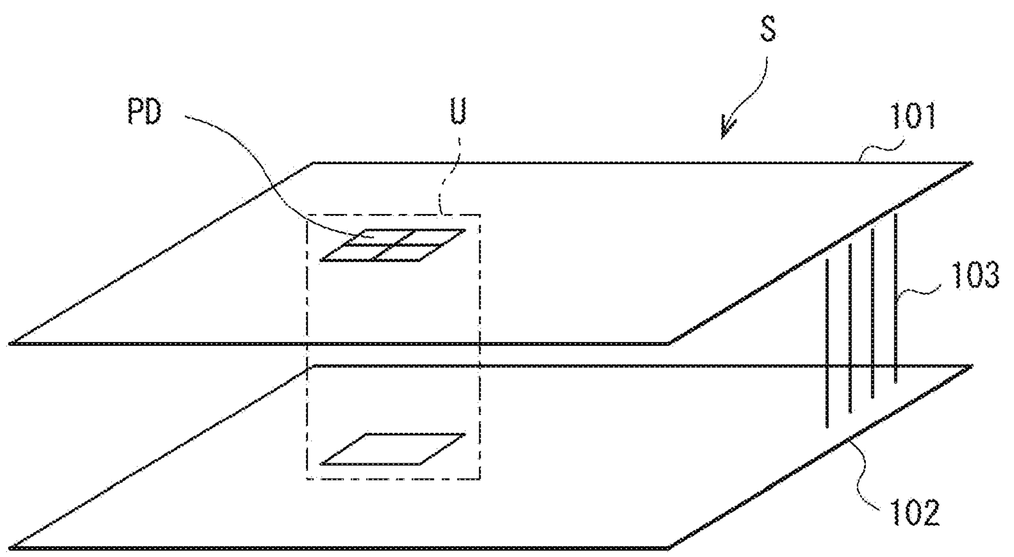
[ FIG. 35 ]
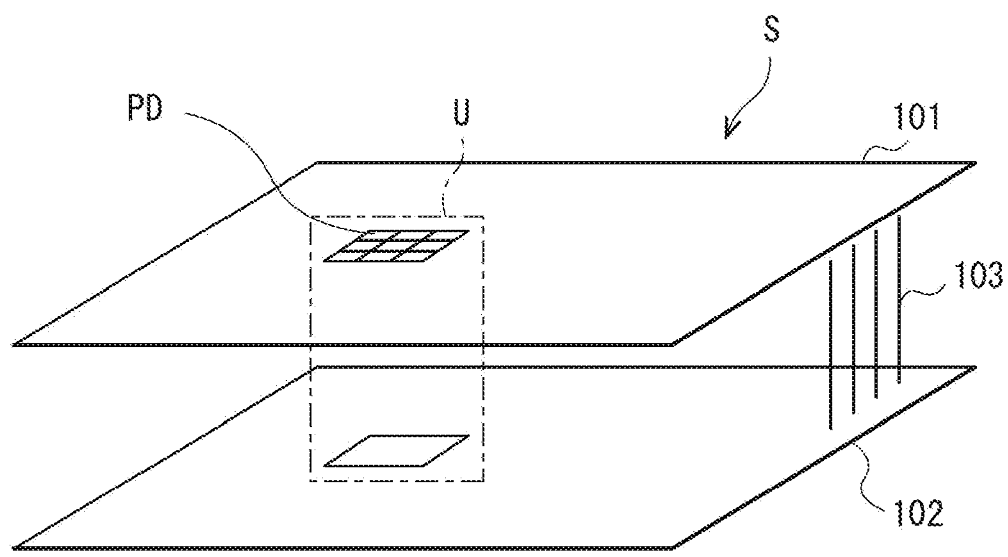

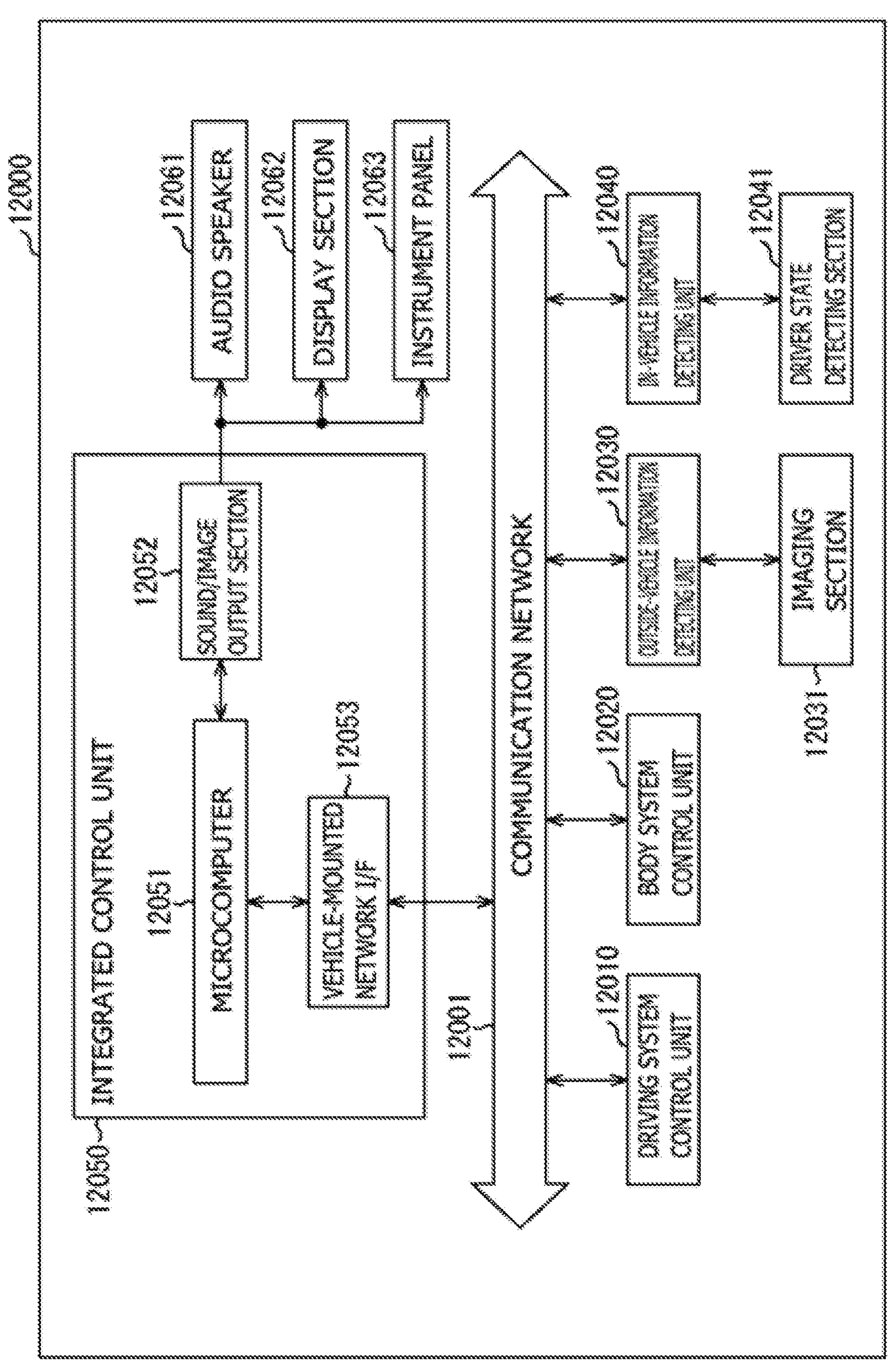
[ FIG. 36 ]

[ FIG. 37 ]
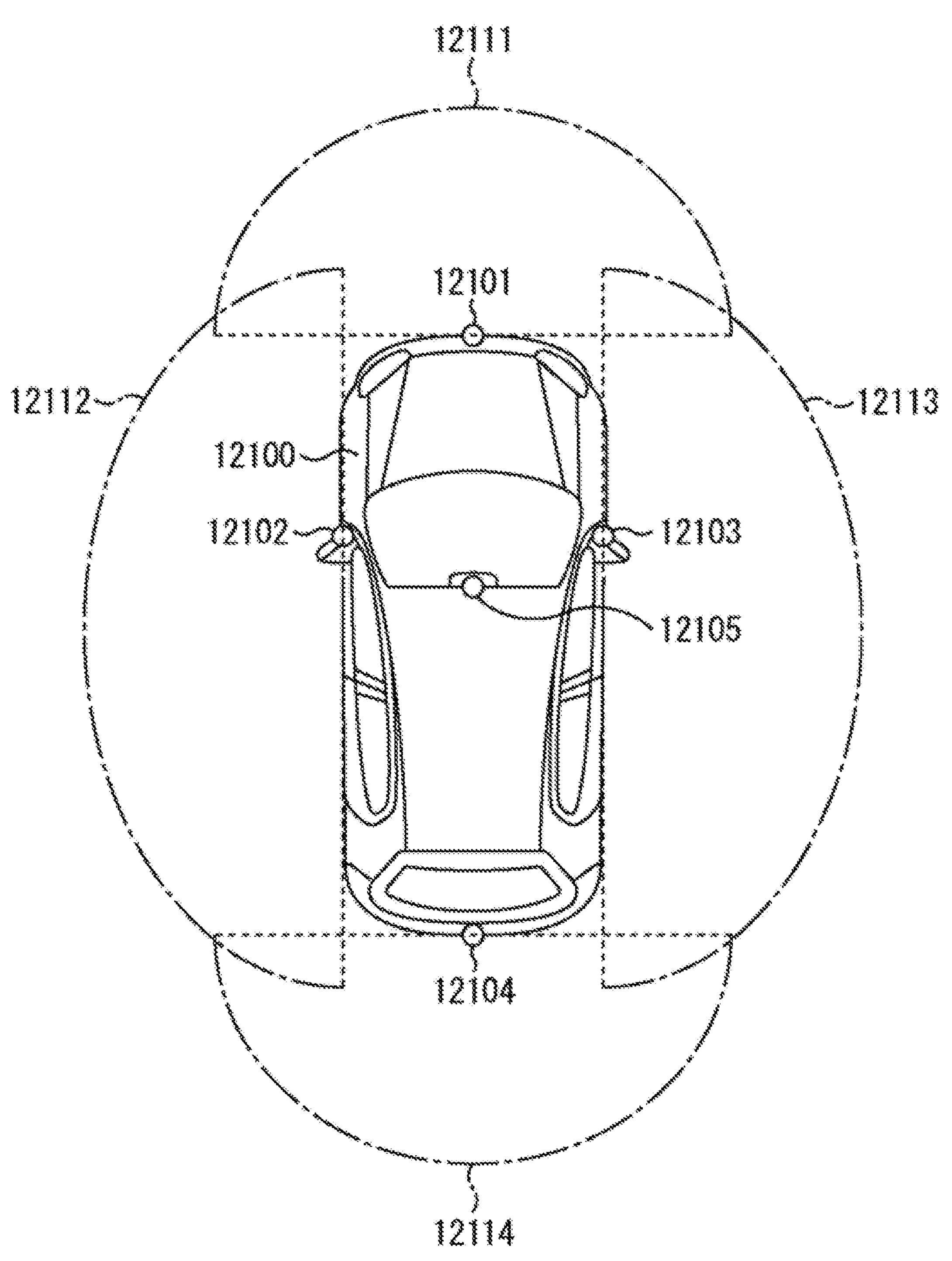

PHOTODETECTION DEVICE AND PHOTODETECTION SYSTEM

CROSS REFERENCE TO RELATED APPLICATIONS

This application is a U.S. National Phase of International Patent Application No. PCT/JP2021/044114 filed on Dec. 1, 2021, which claims priority benefit of Japanese Patent Application No. JP 2021-005817 filed in the Japan Patent Office on Jan. 18, 2021. Each of the above-referenced applications is hereby incorporated herein by reference in its entirety.

TECHNICAL FIELD

The present disclosure relates to a photodetection device and a photodetection system that detect light.

BACKGROUND ART

A TOF (Time OF Flight) method is frequently used to measure a distance to an detection object. In this TOF method, light is emitted, and reflected light reflected by the detection object is detected. Then, in the TOF method, the distance to the measurement object is measured by measuring a time difference between a timing at which the light is emitted and a timing at which the reflected light is detected. For example, PTL 1 discloses a distance measuring device that selectively accumulates electric charge generated by a light-receiving element in one of two electric charge accumulation sections.

CITATION LIST

Patent Literature

PTL 1: Japanese Unexamined Patent Application Publication No. 2018-77143

SUMMARY OF THE INVENTION

In a photodetection device, it is desired to enhance detection accuracy, and a further improvement in detection accuracy is expected.

It is desirable to provide a photodetection device and a photodetection system that make it possible to enhance detection accuracy.

A photodetection device according to an embodiment of the present disclosure includes a light-receiving section, a plurality of switches, a plurality of counters, and a signal generator. The light-receiving section includes a light-receiving element, and is configured to generate a pulse signal including a pulse corresponding to a result of light reception by the light-receiving element. The plurality of switches is configured to be each turned on or off on the basis of a corresponding control signal of a plurality of control signals, and each transmit the pulse signal by being turned on in a pulse period of the corresponding control signal of the plurality of control signals. The plurality of counters is provided corresponding to the plurality of switches, and is configured to each perform counting processing on the basis of the pulse signal supplied through a corresponding switch of the plurality of switches to generate a first count value. The signal generator is configured to generate the plurality of control signals in a detection period to sequentially shift the respective pulse periods of the plurality of control signals by a unit period having a shorter time length than the pulse period.

A photodetection system according to an embodiment of the present disclosure includes a light-emitting section and a photodetector. The light-emitting section is configured to emit light. The photodetector is configured to detect light reflected by a detection object of the light emitted from the light-emitting section. The photodetector includes a light-receiving section, a plurality of switches, a plurality of counters, and a signal generator. The light-receiving section includes a light-receiving element, and is configured to generate a pulse signal including a pulse corresponding to a result of light reception by the light-receiving element. The plurality of switches is configured to be each turned on or off on the basis of a corresponding control signal of a plurality of control signals, and each transmit the pulse signal by being turned on in a pulse period of the corresponding control signal of the plurality of control signals. The plurality of counters is provided corresponding to the plurality of switches, and is configured to each perform counting processing on the basis of the pulse signal supplied through a corresponding switch of the plurality of switches to generate a first count value. The signal generator is configured to generate the plurality of control signals in a detection period to sequentially shift the respective pulse periods of the plurality of control signals by a unit period having a shorter time length than the pulse period.

In the photodetection device and the photodetection system according to the embodiments of the present disclosure, the pulse signal including a pulse corresponding to the result of light reception by the light-receiving element is generated. This pulse signal is supplied to the plurality of counters by turning on or off the plurality of switches on the basis of the plurality of control signals. Each of the plurality of switches is turned on in the pulse period of the control signal to supply the pulse signal to the counter. Each of the plurality of counters performs count processing on the basis of the pulse signal supplied from the switch to generate the first count value. The plurality of control signals are generated to sequentially shift the respective pulse periods of the plurality of control signals by the unit period having a shorter time length than the pulse period.

BRIEF DESCRIPTION OF DRAWINGS

FIG. 1 is a block diagram illustrating a configuration example of a photodetection system according to an embodiment of the present disclosure.

FIG. 2 is a block diagram illustrating a configuration example of a photodetector illustrated in FIG. 1.

FIG. 3 is a circuit diagram illustrating a configuration example of a photodetection unit illustrated in FIG. 2.

FIG. 4A is a circuit diagram illustrating a configuration example of a light-receiving section illustrated in FIG. 3.

FIG. 4B is a circuit diagram illustrating another configuration example of the light-receiving section illustrated in FIG. 3.

FIG. 5 is a block diagram illustrating a configuration example of a signal generator illustrated in FIG. 2.

FIG. 6 is a timing waveform diagram illustrating an operation example of the photodetection system illustrated in FIG. 1.

FIG. 7 is an explanatory diagram illustrating an operation example of a signal processor illustrated in FIG. 2.

FIG. 8 is another explanatory diagram illustrating an operation example of the signal processor illustrated in FIG. 2.

FIG. 9 is a circuit diagram illustrating a configuration example of a photodetection unit according to a comparative example.

FIG. 10 is a timing waveform diagram illustrating an operation example of a photodetection system according to the comparative example.

FIG. 11 is an explanatory diagram illustrating an operation example of a signal processor according to the comparative example.

FIG. 12 is an explanatory diagram illustrating a characteristic example of distance measurement errors.

FIG. 13 is an explanatory diagram illustrating another characteristic example of distance measurement errors.

FIG. 14 is a block diagram illustrating a configuration example of a signal generator according to a modification example.

FIG. 15 is a block diagram illustrating a configuration example of a photodetection unit according to the modification example.

FIG. 16 is a block diagram illustrating a configuration example of a photodetection unit according to another modification example.

FIG. 17 is a timing waveform diagram illustrating an operation example of a photodetection system according to another modification example.

FIG. 18 is a block diagram illustrating a configuration example of a photodetection unit according to another modification example.

FIG. 19 is a timing waveform diagram illustrating an operation example of a photodetection system according to another modification example.

FIG. 20 is an explanatory diagram illustrating an operation example of a signal processor according to another modification example.

FIG. 21 is an explanatory diagram illustrating an operation example of a signal processor according to another modification example.

FIG. 22 is an explanatory diagram illustrating an operation example of a signal processor according to another modification example.

FIG. 23 is an explanatory diagram illustrating an operation example of a signal processor according to another modification example.

FIG. 24 is a block diagram illustrating a configuration example of a photodetection unit according to another modification example.

FIG. 25 is a timing waveform diagram illustrating an operation example of a photodetection system according to another modification example.

FIG. 26 is a block diagram illustrating a configuration example of a photodetection unit according to another modification example.

FIG. 27 is a timing waveform diagram illustrating an operation example of a photodetection system according to another modification example.

FIG. 28 is an explanatory diagram illustrating an operation example of a signal processor according to another modification example.

FIG. 29 is an explanatory diagram illustrating an operation example of a signal processor according to another modification example.

FIG. 30A is a circuit diagram illustrating a configuration example of alight-receiving section according to another modification example.

FIG. 30B is a circuit diagram illustrating a configuration example of alight-receiving section according to another modification example.

FIG. 31 is a block diagram illustrating a configuration example of a photodetection unit according to another modification example.

FIG. 32 is an explanatory diagram illustrating an implementation example of a photodetector according to another modification example.

FIG. 33 is a circuit diagram illustrating a configuration example of a light-receiving section according to another modification example.

FIG. 34 is an explanatory diagram illustrating an implementation example of a photodetector according to another modification example.

FIG. 35 is an explanatory diagram illustrating an implementation example of a photodetector according to another modification example.

FIG. 36 is a block diagram depicting an example of schematic configuration of a vehicle control system.

FIG. 37 is a diagram of assistance in explaining an example of installation positions of an outside-vehicle information detecting section and an imaging section.

MODES FOR CARRYING OUT THE INVENTION

In the following, some embodiments of the present disclosure are described in detail with reference to the drawings. It is to be noted that description is given in the following order.

1. Embodiment
2. Example of Application to Mobile Body

1. Embodiment

Configuration Example

FIG. 1 illustrates a configuration example of a photodetection system (photodetection system 1) according to an embodiment. The photodetection system 1 is a ToF sensor, and is configured to emit light and detect reflected light reflected by a detection object OBJ. The photodetection system 1 includes a light-emitting section 11, an optical system 12, a photodetector 20, and a controller 14.

The light-emitting section 11 is configured to emit a light pulse L0 toward the detection object OBJ on the basis of an instruction from the controller 14. The light-emitting section 11 emits the light pulse L0 on the basis of an instruction from the controller 14 by performing a light emission operation of alternately repeating emission and non-emission of light. The light-emitting section 11 includes, for example, a light source that emits infrared light. This light source is configured with use of, for example, a laser light source, an LED (Light Emitting Diode), or the like.

The optical system 12 includes a lens that forms an image on a light-receiving surface S of the photodetector 20. Alight pulse (reflected light pulse L1) emitted from the light-emitting section 11 and reflected by the detection object OBJ enters this optical system 12.

The photodetector 20 is configured to detect the reflected light pulse L1 on the basis of an instruction from the controller 14. The photodetector 20 then generates a distance image on the basis of a detection result, and outputs image data of the generated distance image as data DT.

The controller 14 is configured to supply control signals to the light-emitting section 11 and the photodetector 20 and control operations of the light-emitting section 11 and the photodetector 20 to thereby control an operation of the photodetection system 1.

FIG. 2 illustrates a configuration example of the photodetector 20. The photodetector 20 includes a photodetection array 21, a signal generator 30, a readout controller 23, a signal processor 24, and a photodetection controller 25.

The photodetection array 21 includes a plurality of photodetection units U disposed in a matrix. The photodetection units U are each configured to detect the reflected light pulse L1 and count the number of detection times of the reflected light pulse L1.

FIG. 3 illustrates a configuration example of the photodetection unit U. The photodetection unit U includes a light-receiving section DET, a plurality of switches SW (eight switches SW1 to SW8 in this example), and a plurality of counters CNT (eight counters CNT1 to CNT8 in this example).

The light-receiving section DET is configured to detect light to thereby generate a pulse signal PLS including a pulse corresponding to the detected light.

FIG. 4A illustrates a configuration example of the light-receiving section DET. In this example, the light-receiving section DET includes a photodiode PD, a resistor R1, and an inverter IV1.

The photodiode PD is a photoelectric conversion element that converts light into electric charge. The photodiode PD has an anode supplied with a power supply voltage VSS, and a cathode coupled to a node N1. It is possible to use, for example, an avalanche photodiode (APD; Avalanche Photodiode), a single photon avalanche diode (SPAD; Single Photon Avalanche Diode), or the like for the photodiode PD.

The resistor R1 has one end supplied with a power supply voltage VDD, and another end coupled to the node N1.

The inverter IV1 is configured to output a low level in a case where a voltage at the node N1 is higher than a logical threshold, and output a high level in a case where the voltage at the node N1 is lower than the logical threshold to thereby generate the pulse signal PLS.

With this configuration, in the light-receiving section DET, the photodiode PD causes avalanche amplification by detecting light, which decreases the voltage at the node N1. Then, in a case where the voltage at the node N1 becomes lower than the logical threshold of the inverter IV1, the pulse signal PLS changes from the low level to the high level. Thereafter, a current flows into the node N1 through the resistor R1 to thereby increase the voltage at the node N1. Then, in a case where the voltage at the node N1 becomes higher than the logical threshold of the inverter IV1, the pulse signal PLS changes from the high level to the low level. Thus, the light-receiving section DET generates the pulse signal PLS including a pulse corresponding to the detected light.

FIG. 4B illustrates another configuration example of the light-receiving section DET. In this example, the light-receiving section DET includes the photodiode PD, a transistor MP1, the inverter IV1, and a control circuit CKT1.

The transistor MP1 is a P-type MOS (Metal Oxide Semiconductor) transistor, and has a gate coupled to an output terminal of the control circuit CKT1, a source supplied with the power supply voltage VDD, and a drain coupled to the node N1.

The control circuit CKT1 is configured to control an operation of the transistor MP1 on the basis of the pulse signal PLS. Specifically, the control circuit CKT1 changes a voltage at the gate of the transistor MP1 to the low level after the pulse signal PLS changes from the low level to the high level, and changes the voltage at the gate of the transistor MP1 to the high level after the pulse signal PLS changes from the high level to the low level.

With this configuration, in the light-receiving section DET, the photodiode PD detects light to thereby decrease the voltage at the node N1. Then, in a case where the voltage at the node N1 becomes lower than the logical threshold of the inverter IV1, the pulse signal PLS changes from the low level to the high level. After this change in the pulse signal PLS, the control circuit CKT1 changes the voltage at the gate of the transistor MP1 to the low level. This turns on the transistor MP1 to cause a current to flow into the node N1 through the transistor MP1, which increases the voltage at the node N1. Then, in a case where the voltage at the node N1 becomes higher than the logical threshold of the inverter IV1, the pulse signal PLS changes from the high level to the low level. After this change in the pulse signal PLS, the control circuit CKT1 changes the voltage at the gate of the transistor MP1 to the high level. This turns off the transistor MP1. Thus, the light-receiving section DET generates the pulse signal PLS including a pulse corresponding to the detected light.

The switch SW1 (FIG. 3) is configured to turn on or off supply of the pulse signal PLS to the counter CNT1 on the basis of a control signal EN1. Specifically, the switch SW1 supplies a signal portion included in the pulse signal PLS to the counter CNT1 in a period (pulse period P1C) in which the control signal EN1 is active (the high level in this example), and supplies a low-level signal to the counter CNT1 in a period in which the control signal EN1 is inactive (the low level in this example). The switch SW1 includes, for example, a logical AND (AND) circuit or a logical OR (OR) circuit.

Likewise, the switch SW2 is configured to turn on or off supply of the pulse signal PLS to the counter CNT2 on the basis of a control signal EN2. The switch SW3 is configured to turn on or off supply of the pulse signal PLS to the counter CNT3 on the basis of a control signal EN3. The switch SW4 is configured to turn on or off supply of the pulse signal PLS to the counter CNT4 on the basis of a control signal EN4. The switch SW5 is configured to turn on or off supply of the pulse signal PLS to the counter CNT5 on the basis of a control signal EN5. The switch SW6 is configured to turn on or off supply of the pulse signal PLS to the counter CNT6 on the basis of a control signal EN6. The switch SW7 is configured to turn on or off supply of the pulse signal PLS to the counter CNT7 on the basis of a control signal EN7. The switch SW8 is configured to turn on or off supply of the pulse signal PLS to the counter CNT8 on the basis of a control signal EN8.

The counter CNT1 is configured to increment a count value CO1 by performing count processing on the basis of a rising edge of the pulse signal PLS supplied from the switch SW1. Likewise, the counter CNT2 is configured to increment a count value CO2 by performing count processing on the basis of a rising edge of the pulse signal PLS supplied from the switch SW2. The counter CNT3 is configured to increment a count value CO3 by performing count processing on the basis of a rising edge of the pulse signal PLS supplied from the switch SW3. The counter CNT4 is configured to increment a count value CO4 by performing count processing on the basis of a rising edge of the pulse signal PLS supplied from the switch SW4. The counter CNT5 is configured to increment a count value CO5 by performing count processing on the basis of a rising edge of the pulse signal PLS supplied from the switch SW5. The counter CNT6 is configured to increment a count value CO6 by performing count processing on the basis of a rising edge of the pulse signal PLS supplied from the switch SW6. The counter CNT7 is configured to increment a count value CO7 by performing count processing on the basis of a rising edge of the pulse signal PLS supplied from the switch SW7. The counter CNT8 is configured to increment a count value CO8 by performing count processing on the basis of a rising edge of the pulse signal PLS supplied from the switch SW8.

The signal generator 30 (FIG. 2) is configured to generate the control signals EN1 to EN8 on the basis of an instruction from the photodetection controller 25 and supply the generated control signals EN1 to EN8 to the plurality of photodetection units U in the photodetection array 21.

FIG. 5 illustrates a configuration example of the signal generator 30. The signal generator 30 includes a control signal generator 31, a clock signal generator 32, flip-flops (F/F) 33 to 39, and drivers DRV1 to DRV8.

The control signal generator 31 is configured to generate a signal EN1A synchronized with a clock signal CLK. The clock signal generator 32 is configured to generate the clock signal CLK.

Each of the flip-flops 33 to 39 is a D-type flip-flop, and is configured to sample a signal inputted to a data terminal D and output the sampled signal from an output terminal Q on the basis of a rising edge of the clock signal CLK supplied to a clock terminal CK. The flip-flops 33 to 39 configure a shift register, and the flip-flops 33, 34, 35, 36, 37, 38, and 39 are coupled in this order. The data terminal D of the flip-flop 33 that is a first-stage circuit of the shift register is supplied with a signal EN1A generated by the control signal generator 31. Then, the flip-flops 33 to 39 respectively generate signals EN2A to EN8A. The waveform of the signal EN2A is a waveform delayed by time equal to one period of the clock signal CLK from the waveform of the signal EN1A. The waveform of the signal EN3A is a waveform delayed by time equal to one period of the clock signal CLK from the waveform of the signal EN2A. The waveform of the signal EN4A is a waveform delayed by time equal to one period of the clock signal CLK from the waveform of the signal EN3A. The waveform of the signal EN5A is a waveform delayed by time equal to one period of the clock signal CLK from the waveform of the signal EN4A. The waveform of the signal EN6A is a waveform delayed by time equal to one period of the clock signal CLK from the waveform of the signal EN5A. The waveform of the signal EN7A is a waveform delayed by time equal to one period of the clock signal CLK from the waveform of the signal EN6A. The waveform of the signal EN8 is a waveform delayed by time equal to one period of the clock signal CLK from the waveform of the signal EN7A.

The drivers DRV1 to DRV8 are configured to supply the control signals EN1 to EN8 to the plurality of photodetection units U in the photodetection array 21. The driver DRV1 is configured to generate the control signal EN1 on the basis of the signal EN1A. The driver DRV2 is configured to generate the control signal EN2 on the basis of the signal EN2A. The driver DRV3 is configured to generate the control signal EN3 on the basis of the signal EN3A. The driver DRV4 is configured to generate the control signal EN4 on the basis of the signal EN4A. The driver DRV5 is configured to generate the control signal EN5 on the basis of the signal EN5A. The driver DRV6 is configured to generate the control signal EN6 on the basis of the signal EN6A. The driver DRV7 is configured to generate the control signal EN7 on the basis of the signal EN7A. The driver DRV8 is configured to generate the control signal EN8 on the basis of the signal EN8A.

The readout controller 23 (FIG. 2) is configured to control an operation of supplying, to the signal processor 24, the count values CO1 to CO8 generated in each of the plurality of photodetection units U in the photodetection array 21, on the basis of an instruction from the photodetection controller 25. For example, the readout controller 23 controls operations of the plurality of photodetection units U to sequentially select the photodetection units U for one row, and cause the selected photodetection units U to supply the count values CO1 to CO8 to the signal processor 24.

The signal processor 24 is configured to generate a distance image on the basis of an instruction from the photodetection controller 25. Specifically, on the basis of the count values CO1 to CO8 supplied from each of the plurality of photodetection units U in the photodetection array 21, the signal processor 24 detects a light reception timing of the reflected light pulse L1 in that photodetection unit U. The signal processor 24 generates a distance image by measuring time (TOF value) from emission of the light pulse L0 by the light-emitting section 11 to detection of the reflected light pulse L1 by the photodetection unit U. The signal processor 24 then outputs image data of the generated distance image as the data DT.

The photodetection controller 25 is configured to control the operation of the photodetector 20 on the basis of an instruction from the controller 14 (FIG. 1) by supplying control signals to the signal generator 30, the readout controller 23, and the signal processor 24 and controlling operations of the signal generator 30, the readout controller 23, and the signal processor 24.

Here, the light-receiving section DET corresponds to a specific example of a "light-receiving section" in the present disclosure. The photodiode PD corresponds to a specific example of a "light-receiving element" in the present disclosure. The pulse signal PLS corresponds to a specific example of a "pulse signal" in the present disclosure. The switches SW1 to SW8 correspond to a specific example of a "plurality of switches" in the present disclosure. The control signals EN1 to EN8 correspond to a specific example of a "plurality of control signals" in the present disclosure. The counters CNT1 to CNT8 correspond to a specific examples of a "plurality of counters" in the present disclosure. The signal generator 30 corresponds to a specific example of a "signal generator" in the present disclosure. The signal processor 24 corresponds to a specific example of a "processor" in the present disclosure.

[Operation and Workings]

Next, the operation and workings of the photodetection system 1 according to the present embodiment are described.

(Overview of Overall Operation)

First, an overview of the overall operation of the photodetection system 1 is described with reference to FIGS. 1 and 2. The light-emitting section 11 emits the light pulse L0 toward the detection object OBJ. The optical system 12 forms an image on the light-receiving surface S of the photodetector 20. The photodetector 20 detects the reflected light pulse L1. The controller 14 supplies control signals to the light-emitting section 11 and the photodetector 20 and controls operations of the light-emitting section 11 and the photodetector 20 to thereby control a distance measuring operation of the photodetection system 1.

In the photodetector 20, the photodetection units U of the photodetection array 21 each generate the count values CO1 to CO8 by detecting the reflected light pulse L1. The signal generator 30 generates the control signals EN1 to EN8, and supplies the control signals EN1 to EN8 to the plurality of photodetection units U. The readout controller 23 controls an operation of supplying, to the signal processor 24, the count values CO1 to CO8 generated in each of the plurality of photodetection units U in the photodetection array 21. The signal processor 24 generates a distance image on the basis of the count values CO1 to CO8 supplied from the plurality of photodetection units U in the photodetection array 21 and outputs image data of the generated distance image as the data DT. The photodetection controller 25 controls the operation of the photodetector 20 on the basis of an instruction from the controller 14 by supplying control signals to the signal generator 30, the readout controller 23, and the signal processor 24 and controlling the operations of the signal generator 30, the readout controller 23, and the signal processor 24.

Detailed Operation

FIG. 6 illustrates an operation example of the photodetection system 1. (A) indicates a waveform of light emitted from the light-emitting section 11. (B) indicates a waveform of light reflected by the detection object OBJ and having entered a certain photodetection unit U. (C) to (J) respectively indicate waveforms of the control signals EN1 to EN8. (K) to (R) respectively indicate waveforms of the count values CO1 to CO8. (S) indicates an operation of the readout controller 23.

In a period (exposure period P1) from a timing t11 to a timing t22, the photodetection system 1 repeatedly emits the light pulse L0, and repeatedly detects the reflected light pulse L1 reflected by the detection object OBJ.

Specifically, in a period from the timing t11 to a timing t12, the light-emitting section 11 emits light ((A) of FIG. 6).

The signal generator 30 changes the control signal EN1 to the high level in a period from the timing t11 to a timing t14 ((C) of FIG. 6). The length of a period (pulse period P1C) in which the control signal EN1 is at the high level is a length corresponding to three unit periods P1A. Likewise, the signal generator 30 changes the control signal EN2 to the high level in a period from the timing t12 to a timing t15, changes the control signal EN3 to the high level in a period from a timing t13 to a timing t16, changes the control signal EN4 to the high level in a period from the timing t14 to a timing t17, changes the control signal EN5 to the high level in a period from the timing t15 to a timing t18, changes the control signal EN6 to the high level in a period from the timing t16 to a timing t19, changes the control signal EN7 to the high level in a period from the timing t17 to a timing t20, and changes the control signal EN8 to the high level in a period from the timing t18 to a timing t21 ((D) of FIG. 6 to (J) of FIG. 6). Thus, the signal generator 30 generates the control signal EN1 to EN8 to sequentially shift periods (pulse periods P1C) in which the control signals EN1 to EN8 are at the high level by the unit period P1A.

In this example, the reflected light pulse L1 is generated at a position across the timing t16 ((B) of FIG. 6).

The switch SW1 is turned on in the period from the timing t11 to the timing t14 on the basis of the control signal EN1 to supply the pulse signal PLS to the counter CNT1. In this period from the timing t11 to the timing t14, the counter CNT1 performs count processing on the basis of a rising edge of the pulse signal PLS supplied from the switch SW1 to increment the count value CO1 ((C) and (K) of FIG. 6). It is to be noted that in this diagram, the count value CO1 changed at the timing t11 is illustrated; however, the count value CO1 may be changed within the period in which the control signal EN1 is at the high level.

Likewise, the switch SW2 is turned on in the period from the timing t12 to the timing t15 on the basis of the control signal EN2 to supply the pulse signal PLS to the counter CNT2. In this period from the timing t12 to the timing t15, the counter CNT2 performs count processing on the basis of a rising edge of the pulse signal PLS supplied from the switch SW2 to increment the count value CO2 ((D) and (L) of FIG. 6).

The switch SW3 is turned on in the period from the timing t13 to the timing t16 on the basis of the control signal EN3 to supply the pulse signal PLS to the counter CNT3. In this period from the timing t13 to the timing t16, the counter CNT3 performs count processing on the basis of a rising edge of the pulse signal PLS supplied from the switch SW3 to increment the count value CO3 ((E) and (M) of FIG. 6).

The switch SW4 is turned on in the period from the timing t14 to the timing t17 on the basis of the control signal EN4 to supply the pulse signal PLS to the counter CNT4. In this period from the timing t14 to the timing t17, the counter CNT4 performs count processing on the basis of a rising edge of the pulse signal PLS supplied from the switch SW4 to increment the count value CO4 ((F) and (N) of FIG. 6).

The switch SW5 is turned on in the period from the timing t15 to the timing t18 on the basis of the control signal EN5 to supply the pulse signal PLS to the counter CNT5. In this period from the timing t15 to the timing t18, the counter CNT5 performs count processing on the basis of a rising edge of the pulse signal PLS supplied from the switch SW5 to increment the count value CO5 ((G) and (O) of FIG. 6).

The switch SW6 is turned on in the period from the timing t16 to the timing t19 on the basis of the control signal EN6 to supply the pulse signal PLS to the counter CNT6. In this period from the timing t16 to the timing t19, the counter CNT6 performs count processing on the basis of a rising edge of the pulse signal PLS supplied from the switch SW6 to increment the count value CO6 ((H) and (P) of FIG. 6).

The switch SW7 is turned on in the period from the timing t17 to the timing t20 on the basis of the control signal EN7 to supply the pulse signal PLS to the counter CNT7. In this period from the timing t17 to the timing t20, the counter CNT7 performs count processing on the basis of a rising edge of the pulse signal PLS supplied from the switch SW7 to increment the count value CO7 ((I) and (Q) of FIG. 6).

The switch SW8 is turned on in the period from the timing t18 to the timing t21 on the basis of the control signal EN8 to supply the pulse signal PLS to the counter CNT8. In this period from the timing t18 to the timing t21, the counter CNT8 performs count processing on the basis of a rising edge of the pulse signal PLS supplied from the switch SW8 to increment the count value CO8 ((J) and (R) of FIG. 6).

For example, in a period from the timing t12 to the timing t13, two switches SW1 and SW2 are turned on, and the counters CNT1 and CNT2 perform count processing. In addition, in a period from the timing t13 to the timing t14, three switches SW1 to SW3 are turned on, and the counters CNT1 to CNT3 perform count processing. Thus, in the photodetection system 1, two or more of the switches SW1 to SW8 are turned on, and two or more counters CNT coupled to the two or more switches SW that are turned on perform count processing.

The photodetection unit U repeats such an operation in a period (detection period P1B) from the timing t11 to the timing t19. Accordingly, in a plurality of periods (e.g., a period from the timing t11 to the timing t14, a period from the timing t19 to the timing t22, and the like) in which the control signal EN1 is at the high level, the counter CNT1 performs count processing to generate the count value CO1. The same applies to the counters CNT2 to CNT8.

Then, in a period (readout period P2) from a timing t24 to a timing t25, the readout controller 23 performs readout control CR, thereby controlling the operations of the plurality of photodetection units U to supply, to the signal processor 24, the count values CO1 to CO8 generated by each of the plurality of photodetection units U ((S) of FIG. 6). Thereafter, the count values CO1 to CO8 in the counters CNT1 to CNT8 are reset.

On the basis of the count values CO1 to CO8 supplied from the photodetection unit U, the signal processor 24 calculates the light reception timing of the reflected light pulse L1 in that photodetection unit U. Specifically, the signal processor 24 calculates the respective count values CN (count values CN1 to CN8) in a plurality of unit periods P1A in the detection period P1B on the basis of the count values CO1 to CO8 to thereby calculate the light reception timing of the reflected light pulse L1.

FIG. 7 illustrates a relationship between the count values CO1 to CO8 and the count values CN1 to CN8.

The count value CO1 is an accumulation of count values in a first unit period P1A, a second unit period P1A, and a third unit period P1A in the detection period P1B. The count value CO2 is an accumulation of count values in the second unit period P1A, the third unit period P1A, and a fourth unit period P1A in the detection period P1B. The same applies to the count values CO3 to CO8. Thus, each of the count values CO1 to CO8 is an accumulation of count values in three unit periods P1A.

The count value CN1 is an accumulation of count values in the first unit period P1A in the detection period P1B. The count value CN2 is an accumulation of count values in the second unit period P1A in the detection period P1B. The same applies to the count values CN3 to CN8. Thus, each of the count values CN1 to CN8 is an accumulation of count values in one unit period P1A.

It is possible to represent the count values CO1 to CO8 with use of the count values CN1 to CN8.

$$CO1=CN1+CN2+CN3$$

$$CO2=CN2+CN3+CN4$$

$$CO3=CN3+CN4+CN5$$

$$CO4=CN4+CN5+CN6$$

$$CO5=CN5+CN6+CN7$$

$$CO6=CN6+CN7+CN8$$

$$CO7=CN7+CN8+CN1$$

$$CO8=CN8+CN1+CN2$$

Simultaneously solving these eight equations makes it possible to represent the count values CN1 to CN8 with use of the count values CO1 to CO8. Thus, the signal processor 24 is able to calculate the light reception timing of the reflected light pulse L1 by calculating the count values CN1 to CN8.

FIG. 8 illustrates an example of a more specific operation of the photodetection system 1. In this example, the light-emitting section 11 emits the light pulse L0 in a period from a timing t31 to a timing t32, and the reflected light pulse L1 enters the photodetection unit U in a period from a timing t36 to a timing t38. In addition, ambient light LA enters the photodetection unit U in all periods.

In the period from the timing t36 to the timing t38, in a case where the reflected light pulse L1 enters the photodiode PD of the light-receiving section DET, the photodiode PD causes avalanche amplification with a certain probability. Accordingly, the light-receiving section DET generates a pulse by changing the pulse signal PLS from the low level to the high level at a certain timing of the timings t36 to t38. In a case where a rising edge of this pulse signal PLS is earlier than the timing t37, the counters CNT3, CNT4, and CNT5 perform count processing to increment the count values CO3, CO4, and CO5. In addition, in a case where the rising edge of the pulse signal PLS is later than the timing t37, the counters CNT4, CNT5, and CNT6 perform count processing to increment the count values CO4, CO5, and CO6.

In addition, even in a case where ambient light enters the photodiode PD, the photodiode PD causes avalanche amplification. Accordingly, the counters CNT1 to CNT8 respectively increment the count values CO1 to CO8 on the basis of the ambient light.

As a result, in this example, the count values CO3 to CO6 each include both a reflected light component and an ambient light component, and the count values CO1 to CO3, CO7, and CO8 each include only an ambient light component.

The signal processor 24 calculates the count values CN1 to CN8 in the plurality of unit periods P1A in the detection period P1B on the basis of such count values CO1 to CO8. In this example, the count values CN5 and CN6 each include both a reflected light component and an ambient light component, and the count value CN1 to CO4, CO7, and CO8 each include only an ambient light component. The signal processor 24 is able to calculate the light reception timing of the reflected light pulse L1 on the basis of the count values CN5 and CN6 each including the reflected light component.

Here, the unit period P1A corresponds to specific example of a "unit period" in the present disclosure. The pulse period P1C corresponds to a specific example of a "pulse period" in the present disclosure. The detection period P1B corresponds to a specific example of a "detection period" in the present disclosure. Each of the count values CO1 to CO8 corresponds to a specific example of a "first count value" in the present disclosure. Each of the count values CN1 to CN8 corresponds to a specific example of a "second count value" in the present disclosure.

In the photodetection system 1, the light reception timing of the reflected light pulse L1 is calculated on the basis of two count values CN (the count values CN5 and CN6 in this example) each including a reflected light component in such a manner. These two count values CN include the reflected light component, and ambient light components in two unit periods P1A of the detection period P1B. This makes it possible for the photodetection system 1 to enhance an S/N (Signal/Noise) ratio.

Comparative Example

Next, effects of the present embodiment are described in comparison with a photodetection system 1 according to a comparative example. The present comparison example is a so-called indirect ToF sensor in which electric charge generated by a light-receiving element is selectively accumulated in one of two floating diffusions.

FIG. 9 illustrates an example of a photodetection unit UR in a photodetection system 1R according to the comparative example. This photodetection unit UR includes the photodiode PD, transistors MN1 and MN2, and floating diffusions FD1 and FD2.

The photodiode PD has an anode supplied with the power supply voltage VSS, and a cathode coupled to sources of the transistors MN1 and MN2.

The transistors MN1 and MN2 are N-type MOS transistors. The transistor MN has a gate supplied with a control signal CTL1, the source coupled to the cathode of the photodiode PD, and a drain coupled to the floating diffusion FD1. The transistor MN2 has a gate supplied with a control signal CTL2, the source coupled to the cathode of the photodiode PD, and a drain coupled to the floating diffusion FD2. The control signals CTL1 and CTL2 are supplied to an unillustrated signal generator 30R.

The floating diffusion FD1 is configured to accumulate electric charge transferred from the photodiode PD through the transistor MN1. The floating diffusion FD2 is configured to accumulate electric charge transferred from the photodiode PD through the transistor MN2. The floating diffusions FD1 and FD2 are each configured with use of, for example, a diffusion layer formed on a surface of a semiconductor substrate. In FIG. 9, the floating diffusions FD1 and FD2 are illustrated by using the symbol of a capacitor.

FIG. 10 illustrates an operation example of the photodetection system 1R. (A) indicates a waveform of light emitted from the light-emitting section 11. (B) indicates a waveform of light reflected by the detection object OBJ and having entered a certain photodetection unit U. (C), (E), (G), and (I) each indicate a waveform of the control signal CTL1. (D), (F), (H), and (J) each indicate a waveform of the control signal CTL2. In the photodetection system 1R, the exposure period P1 includes four sub-frame periods PS (sub-frame periods PS1 to PS4). The control signals CTL1 and CTL2 illustrated in (C) and (D) are used in the sub-frame period PS1, and the control signals CTL1 and CTL2 illustrated in (E) and (F) are used in the sub-frame period PS2, the control signal CTL1 and CTL2 illustrated in (G) and (H) are used in the sub-frame period PS3, and the control signals CTL1 and CTL2 illustrated in (I) and (J) are used in the sub-frame period PS4.

In the exposure period P1, the photodetection system 1R repeatedly emits the light pulse L0, and repeatedly detects the reflected light pulse L1 reflected by the detection object OBJ.

Specifically, in a period from a timing t41 to a timing t42, the light-emitting section 11 emits the light pulse L0 ((A) of FIG. 10).

In the sub-frame period PS1, the signal generator 30R changes the control signal CTL1 from the low level to the high level and changes the control signal CTL2 from the high level to the low level at the timing t41, and changes the control signal CTL1 from the high level to the low level and changes the control signal CTL2 from the low level to the high level at a timing t45. The transistor MN1 is turned on in a period from the timing t41 to the timing t45 on the basis of the control signal CTL1, and electric charge generated by the photodiode PD is accumulated in the floating diffusion FD1. The transistor MN2 is turned on in a period from the timing t45 to a timing t49 on the basis of the control signal CTL2, and electric charge generated by the photodiode PD is accumulated in the floating diffusion FD2.

In the sub-frame period PS2, the signal generator 30R changes the control signal CTL1 from the low level to the high level and changes the control signal CTL2 from the high level to the low level at the timing t42, and changes the control signal CTL1 from the high level to the low level and changes the control signal CTL2 from the low level to the high level at a timing t46. The transistor MN1 is turned on in a period from the timing t42 to the timing t46 on the basis of the control signal CTL1, and electric charge generated by the photodiode PD is accumulated in the floating diffusion FD1. The transistor MN2 is turned on in a period from the timing t46 to a timing t50 on the basis of the control signal CTL2, and electric charge generated by the photodiode PD is accumulated in the floating diffusion FD2.

In the sub-frame period PS3, the signal generator 30R changes the control signal CTL1 from the low level to the high level and changes the control signal CTL2 from the high level to the low level at a timing t43, and changes the control signal CTL1 from the high level to the low level and changes the control signal CTL2 from the low level to the high level at a timing t47. The transistor MN1 is turned on in a period from the timing t43 to a timing t47 on the basis of the control signal CTL1, and electric charge generated by the photodiode PD is accumulated in the floating diffusion FD1. The transistor MN2 is turned on in a period from the timing t47 to a timing t51 on the basis of the control signal CTL2, and electric charge generated by the photodiode PD is accumulated in the floating diffusion FD2.

In the sub-frame period PS4, the signal generator 30R changes the control signal CTL1 from the low level to the high level and changes the control signal CTL2 from the high level to the low level at a timing t44, and changes the control signal CTL1 from the high level to the low level and changes the control signal CTL2 from the low level to the high level at a timing t48. The transistor MN1 is turned on in a period from the timing t44 to the timing t48 on the basis of the control signal CTL1, and electric charge generated by the photodiode PD is accumulated in the floating diffusion FD1. The transistor MN2 is turned on in a period from the timing t48 to a timing t52 on the basis of the control signal CTL2, and electric charge generated by the photodiode PD is accumulated in the floating diffusion FD2.

Thus, in the photodetection system 1R, in each of the sub-frame periods PS1 to PS4, only one of the two transistors MN1 and MN2 is turned on.

FIG. 11 illustrates an example of a more specific operation of the photodetection system 1R. In this example, in a period from the timing t51 to the timing t52, the light-emitting section 11 emits the light pulse L0, and in a period from a timing t56 to a timing t58, the reflected light pulse L1 enters the photodetection unit UR. In addition, the ambient light LA enters the photodetection unit UR in all periods.

In the sub-frame period PS1, electric charge CH1 accumulated in the floating diffusion FD1 includes only an ambient light component, and electric charge CH2 accumulated in the floating diffusion FD2 includes both a reflected light component and an ambient light component.

In the sub-frame period PS2, the electric charge CH1 accumulated in the floating diffusion FD1 includes a reflected light component and an ambient light component, and the electric charge CH2 accumulated in the floating diffusion FD2 includes both a reflected light component and an ambient light component. The reflected light component in the electric charge CH2 is larger than the reflected light component in the electric charge CH1.

In the sub-frame period PS3, the electric charge CH1 accumulated in the floating diffusion FD1 includes a reflected light component and an ambient light component, and the electric charge CH2 accumulated in the floating diffusion FD2 includes only an ambient light component.

In the sub-frame period PS4, the electric charge CH1 accumulated in the floating diffusion FD1 includes a reflected light component and an ambient light component, and the electric charge CH2 accumulated in the floating diffusion FD2 includes only an ambient light component.

The signal processor 24R of the photodetection system 1R is able to calculate the light reception timing of the reflected light pulse L1 on the basis of a total amount of the electric charge CH1 and a total amount of the electric charge CH2 in the four sub-frame periods PS1 to PS4. The electric charge CH1 and the electric charge CH2 each include a reflected light component, and an ambient light component in the detection period P1B. Accordingly, an S/N ratio in the photodetection system 1R deteriorates.

Meanwhile, in the photodetection system 1 according to the present embodiment, the light reception timing of the reflected light pulse L1 is calculated on the basis of two count values CN (the count values CN5 and CN6 in an example in FIG. 8) each including a reflected light component. These two count values CN include a reflected light component, and ambient light components in two unit periods P1A of the detection period P1B. This makes it possible to enhance an S/N ratio in the photodetection system 1.

FIGS. 12 and 13 illustrate an characteristic example of distance measurement errors in the photodetection system 1 according to the present embodiment and the photodetection system 1R according to the comparative example. FIG. 12 illustrates a case where no ambient light is present, and FIG. 13 illustrates a case where ambient light is strong. A horizontal axis indicates a distance to the detection object OBJ, and a vertical axis indicates an distance measurement error.

In a case where no ambient light is present, as illustrated in FIG. 12, the distance measurement error in the photodetection system 1 is lower than the distance measurement error in the photodetection system 1R. Specifically, the distance measurement error in the photodetection system 1 is reduced to about $1/\sqrt{8}$ of the distance measurement error in the photodetection system 1R.

Even in a case where ambient light is strong, as illustrated in FIG. 13, the distance measurement error in the photodetection system 1 is lower than the distance measurement error in the photodetection system 1R. Specifically, the distance measurement error in the photodetection system 1 is reduced to about ¼ of the distance measurement error in the photodetection system 1R.

Thus, in the photodetection system 1 according to the present embodiment, it is possible to enhance an S/N ratio, thereby making it possible to reduce the measurement error more than in the photodetection system 1R according to the comparative example.

In the photodetection system 1R (FIGS. 9 and 10) according to the present comparative example, for example, to enhance distance measurement accuracy, a method of increasing frequencies of the control signals CTL1 and CTL2 may be adopted. However, in a typical semiconductor circuit, an operation frequency has an upper limit; therefore, there is a limit to improvement in distance measurement accuracy. In addition, in a case where the frequencies of the control signals CTL1 and CTL2 are increased in such a manner, a distance measurement range is narrowed. Specifically, in a case where the frequencies of the control signals CTL1 and CTL2 are doubled, the distance measurement range is halved. In addition, for example, to enhance distance measurement accuracy, a method of decreasing a phase difference between the control signals CTL1 and a phase difference between the control signal CTL2 in a plurality of sub-frame periods PS may be adopted. However, in this case, the number of sub-frame periods PS is increased. Specifically, for example, in a case where the phase difference is halved, the number of the sub-frame periods PS is doubled. As a result, distance measurement time is increased.

Meanwhile, in the photodetection system 1 according to the present embodiment (FIGS. 3 and 6), to enhance distance measurement accuracy, it is possible to decrease a phase difference between a plurality of control signals EN. For example, in a case where distance measurement accuracy is doubled, it is possible to halve the phase difference between the plurality of control signals EN and double the number of switches SW and the number of counters CNT. In this case, in the photodetection system 1, unlike the comparative example, the operation frequency, the distance measurement range, and the distance measurement time are all maintained. This makes it possible to enhance distance measurement accuracy relatively easily in the photodetection system 1.

Thus, in the photodetection system 1, eight switches SW1 to SW8 are provided. The eight switches SW1 to SW8 are each turned on or off on the basis of eight control signals EN1 to EN8, and are each turned on in the pulse period P1C of a corresponding control signal of these control signals EN1 to EN8 to thereby transmit the pulse signal PLS. In addition, eight counters CNT1 to CNT8 are provided corresponding to the eight switches SW1 to SW8. Each of the eight counters CNT1 to CNT8 performs count processing on the basis of the pulse signal PLS supplied through a corresponding switch of these switches SW1 to SW8 to thereby generate the count value CO. In addition, the signal generator 30 is provided. The signal generator 30 generates eight control signals EN1 to EN8 in the detection period P1B to sequentially shift the pulse periods P1C of the eight control signals EN1 to EN8 by the unit period P1A having a shorter time length than the pulse period P1C. Thus, in the photodetection system 1, for example, two or more of the switches SW1 to SW8 are turned on, and two or more counters CNT coupled to the two or more switches SW that are turned on perform count processing. Then, for example, the photodetection system 1 is able to calculate the count values CN1 to CN8 in the plurality of unit periods P1A on the basis of the count values CO1 to CO8 of the eight counters CNT1 to CNT8. Thus, in the photodetection system 1, it is possible to calculate the light reception timing of the reflected light pulse L1 on the basis of two count values CN each including a reflected light component, which makes it possible to enhance distance measurement accuracy.

[Effects]

As described above, in the present embodiment, eight switches are provided that are each turned on or off on the basis of eight control signals, and are each turned on in a pulse period of a corresponding control signal of these control signals to thereby transmit a pulse signal. In addition, eight counters are provided corresponding to the eight switches, and are each provided to generate a count value by performing counting processing on the basis of the pulse signal supplied through a corresponding switch of these switches. In addition, a signal generator is provided that generates the eight control signals in a detection period to sequentially shift pulse periods of the eight control signals by a unit period having a shorter time length than the pulse period. This makes it possible to enhance detection accuracy.

Modification Example 1

In the embodiment described above, the signal generator 30 generates eight control signals EN1 to EN8, but this is not limitative. Instead of this, for example, a signal generator may generate some of the eight control signals EN1 to EN8, and a photodetection unit may generate remaining control signals EN. The present modification example is described in detail below.

A photodetection system 1A according to the present modification example includes a photodetector 20A, as with the photodetection system 1 (FIG. 1) according to the embodiment described above. The photodetector 20A includes a signal generator 30A and a photodetection array 21A, as with the photodetector 20 (FIG. 2) according to the embodiment described above.

The signal generator 30A is configured to generate five control signals EN1 to EN5 of the eight control signals EN1 to EN8 and supply the generated control signals EN1 to EN5 to the photodetection array 21A.

FIG. 14 illustrates a configuration example of the signal generator 30A. The signal generator 30A includes the control signal generator 31, the clock signal generator 32, the flip-flops (F/F) 33 to 36, and the drivers DRV1 to DRV5. That is, while the signal generator 30 (FIG. 5) according to the embodiment described above generates eight control signals EN1 to EN8 by providing seven flip-flops 33 to 39 and eight drivers DRV1 to DRV8, the signal generator 30A according to the present modification example generates five control signals EN1 to EN5 by providing four flip-flops 33 to 36 and five drivers DRV1 to DRV5.

The photodetection array 21A includes a plurality of photodetection units UA disposed in a matrix. The photodetection units UA are each configured to detect the reflected light pulse L1 and count the number of detection times of the reflected light pulse L1. The photodetection units UA also have a function of generating the control signals EN6 to EN8 on the basis of the control signals EN1 to EN5.

FIG. 15 illustrates a configuration example of the photodetection unit UA. The photodetection unit UA includes negative OR (NOR) circuits NR1 to NR3. The NOR circuit NR1 is configured to generate the control signal EN6 by finding negative OR of the control signal EN1 and the control signal EN3. The NOR circuit NR2 is configured to generate the control signal EN7 by finding negative OR of the control signal EN2 and the control signal EN4. The NOR circuit NR3 is configured to generate the control signal EN8 by finding negative OR of the control signal EN3 and the control signal EN5.

With this configuration, in the photodetection system 1A, it is possible to reduce, for example, the number of wiring lines of the control signals EN in the photodetection array 21A.

Modification Example 2

In the embodiment described above, as illustrated in FIG. 3, eight counters CNT are provided in the photodetection unit U, but this is not limitative. Seven or less counters CNT, or nine or more counters CNT may be provided in the photodetection unit U. An example in which five counters CNT are provided is described in detail below.

A photodetection system 1B according to the present modification example includes a photodetector 20B, as with the photodetection system 1 (FIG. 1) according to the embodiment described above. The photodetector 20B includes a signal generator 30B, a photodetection array 21B, a readout controller 23B, and a signal processor 24B, as with the photodetector 20 (FIG. 2) according to the embodiment described above.

The signal generator 30B is configured to generate five control signals EN1 to EN5 and supply the generated control signals EN1 to EN5 to the photodetection array 21B.

The photodetection array 21B includes a plurality of photodetection units U disposed in a matrix.

FIG. 16 illustrates a configuration example of the photodetection unit UB. The photodetection unit UB includes the light-receiving section DET, five switches SW (switches SW1 to SW5), and five counters CNT (counters CNT1 to CNT5).

The switch SW1 is configured to turn on or off supply of the pulse signal PLS to the counter CNT1 on the basis of the control signal EN1. The same applies to the switches SW2 to SW5.

The counter CNT1 is configured to increment the count value CO1 by performing count processing on the basis of a rising edge of the pulse signal PLS supplied from the switch SW1. The same applies to the counters CNT2 to CNT5.

The readout controller 23B is configured to control an operation of supplying, to the signal processor 24B, the count values CO1 to CO5 generated in each of the plurality of photodetection units UB in the photodetection array 21B, on the basis of an instruction from the photodetection controller 25.

The signal processor 24B detects, on the basis of the count values CO1 to CO5 supplied from each of the plurality of photodetection units UB in the photodetection array 21B, the light reception timing of the reflected light pulse L1 in that photodetection unit UB. The signal processor 24B then generates a distance image by measuring time (TOF value) from emission of the light pulse L0 by the light-emitting section 11 to detection of the reflected light pulse L1 by the photodetection unit U.

FIG. 17 illustrates an operation example of the photodetection system 1B. (A) indicates a waveform of light emitted from the light-emitting section 11. (B) indicates a waveform of light reflected by the detection object OBJ and having entered a certain photodetection unit U. (C) to (G) respectively indicate waveforms of the control signals EN1 to EN5. (H) to (L) respectively indicate waveforms of the count values CO1 to CO5. (M) indicates an operation of the readout controller 23B.

In a period from a timing t71 to a timing t79 (exposure period P1), the photodetection system 1 repeatedly emits the light pulse L0, and repeatedly detects the reflected light pulse L1 reflected by the detection object OBJ.

Specifically, in a period from the timing t71 to a timing t72, the light-emitting section 11 emits light ((A) of FIG. 17).

The signal generator 30B changes the control signal EN1 to the high level in a period from the timing t71 to a timing t73 ((C) of FIG. 17). The length of a period (pulse period P1C) in which the control signal EN1 is at the high level is a length corresponding to two unit periods P1A. Likewise, the signal generator 30B changes the control signal EN2 to the high level in a period from the timing t72 to a timing t74, changes the control signal EN3 to the high level in a period from the timing t73 to a timing t75, changes the control signal EN4 to the high level in a period from the timing t74 to a timing t76, and changes the control signal EN5 to the high level in a period from the timing t75 to a timing t77 ((D) of FIG. 17 to (G) of FIG. 17). Thus, the signal generator 30B generates the control signals EN1 to EN5 to sequentially shift periods (pulse periods P1C) in which the control signals EN1 to EN5 are at the high level by the unit period P1A.

In this example, the reflected light pulse L1 is generated at a position across the timing t73 ((B) of FIG. 17).

a position

The switch SW1 is turned on in the period from the timing t71 to the timing t73 on the basis of the control signal EN1 to supply the pulse signal PLS to the counter CNT1. In this period from the timing t71 to the timing t73, the counter CNT1 performs count processing on the basis of a rising edge of the pulse signal PLS supplied from the switch SW1 to increment the count value CO1 ((C) and (H) of FIG. 17). The same applies to the switches SW2 to SW5 and the counters CNT2 to CNT5.

The photodetection unit UB repeats such an operation in a period (detection period P1B) from the timing t71 to the timing t75. Accordingly, in a plurality of periods (e.g., a period from the timing t71 to the timing t73, a period from the tithing t76 to the timing t78, and the like) in which the control signal EN1 is at the high level, the counter CNT1 performs count processing to generate the count value CO1. The same applies to the counters CNT2 to CNT5.

Then, in a period (readout period P2) from a timing t80 to a timing t81, the readout controller 23B performs readout control CR, thereby controlling the operations of the plurality of photodetection units UB to supply, to the signal processor 24B, the count values CO1 to CO5 generated by each of the plurality of photodetection units UB ((M) of FIG. 17). Thereafter, the count values CO1 to CO5 in the counters CNT1 to CNT5 are reset.

The signal processor 24B calculates the respective count values CN in the plurality of unit periods P1A in the detection period P1B on the basis of the count values CO1 to CO5 to calculate the light reception timing of the reflected light pulse L1.

Modification Example 3

In the embodiment described above, as illustrated in FIG. 6, the operation in the detection period P1B is continuously repeated, but this is not limitative. For example, the operation in the detection period P1B may be performed individually a plurality of times. A photodetection system 1C according to the present modification example is described in detail below.

The photodetection system 1C according to the present modification example includes a photodetector 20C as with the photodetection system 1 (FIG. 1) according to the embodiment described above. The photodetector 20C includes a signal generator 30C, a photodetection array 21C, a readout controller 23C, and a signal processor 24C, as with the photodetector 20 (FIG. 2) according to the embodiment described above.

The signal generator 30C is configured to generate fourteen control signals EN1 to EN14 and supply the generated control signal EN1 to EN14 to the photodetection array 21C.

The photodetection array 21C includes a plurality of photodetection units UC disposed in a matrix.

FIG. 18 illustrates a configuration example of the photodetection unit UC. The photodetection unit UC includes the light-receiving section DET, fourteen switches SW (switches SW1 to SW14), and fourteen counters CNT (counters CNT1 to CNT14).

The switch SW1 is configured to turn on or off supply of the pulse signal PLS to the counter CNT1 on the basis of the control signal EN1. The same applies to the switches SW2 to SW14.

The counter CNT1 is configured to increment the count value CO1 by performing count processing on the basis of a rising edge of the pulse signal PLS supplied from the switch SW1. The same applies to the counters CNT2 to CNT14.

The readout controller 23C is configured to control an operation of supplying, to the signal processor 24C, the count values CO1 to CO14 generated in each of the plurality of photodetection units UC in the photodetection array 21C, on the basis of an instruction from the photodetection controller 25.

The signal processor 24C is configured to detect, on the basis of the count values CO1 to CO14 supplied from each of the plurality of photodetection units UC in the photodetection array 21C, the light reception timing of the reflected light pulse L1 in that photodetection unit UC. The signal processor 24C then generates a distance image by measuring time (TOF value) from emission of the light pulse L0 by the light-emitting section 11 to detection of the reflected light pulse L1 by the photodetection unit UC.

FIG. 19 illustrates an operation example of the photodetection system 1C. (A) indicates a waveform of light emitted from the light-emitting section 11. (B) indicates a waveform of light reflected by the detection object OBJ and having entered a certain photodetection unit U. (C) to (P) respectively indicate waveforms of the control signals EN1 to EN14. (Q) indicates an operation of the readout controller 23C.

In each of a plurality of detection periods P1B in the exposure period P1, the photodetection system 1 emits the light pulse L0, and detects the reflected light pulse L1 reflected by the detection object OBJ.

Specifically, in a period from a timing t91 to a timing t92, the light-emitting section 11 emits the light pulse L0 ((A) of FIG. 19).

The signal generator 30C changes the control signal EN1 to the high level in a period from the timing t91 to a timing t94 ((C) of FIG. 19). The length of a period (pulse period P1C) in which the control signal EN1 is at the high level is a length corresponding to three unit periods P1A. Likewise, the signal generator 30C changes the control signal EN2 to high level in a period from the timing t92 to a timing t95, changes the control signal EN3 to the high level in a period from a timing t93 to a timing t96, changes the control signal EN4 to the high level in a period from the timing t94 to a timing t97, changes the control signal EN5 to the high level in a period from the timing t95 to a timing t98, changes the control signal EN6 to the high level in a period from the timing t96 to a timing t99, changes the control signal EN6 to the high level in a period from the timing t97 to a timing t100, changes the control signal EN6 to the high level in a period from the timing t98 to a timing t101, changes the control signal EN6 to the high level in a period from the timing t99 to a timing t102, changes the control signal EN6 to the high level in a period from the timing t100 to a timing t103, changes the control signal EN6 to the high level in a period from the timing t101 to a timing t105, changes the control signal EN6 to the high level in a period from the timing t102 to a timing t105, changes the control signal EN6 to the high level in a period from the timing t103 to a timing t106, and changes the control signal EN6 to the high level in a period from the timing t104 to a timing t107 ((D) of FIG. 19 to (P) of FIG. 19). Thus, the signal generator 30C generates the control signals EN1 to EN14 to sequentially shift periods (pulse periods P1C) in which the control signals EN1 to EN14 are at the high level by the unit period P1A.

In this example, the reflected light pulse L1 is generated at a position across the timing t96 ((B) of FIG. 19).

The switch SW1 is turned on in the period from the timing t91 to the timing t94 on the basis of the control signal EN1 to supply the pulse signal PLS to the counter CNT1. In this period from the timing t91 to the timing t94, the counter CNT1 performs count processing on the basis of a rising edge of the pulse signal PLS supplied from the switch SW1 to increment the count value CO1 ((C) of FIG. 19). The same applies to the switches SW2 to SW14 and the counters CNT2 to CNT14.

The photodetection unit UC individually repeats such an operation in a period (detection period P1B) from the timing t91 to the timing t107 in the exposure period P1 at small time intervals. Accordingly, in a plurality of periods in which the control signal EN1 is at the high level, the counter CNT1 performs count processing to generate the count value CO1. The same applies to the counters CNT2 to CNT14.

Then, in a period (readout period P2) from a timing t108 to a timing t109, the readout controller 23C performs readout control CR, thereby controlling the operations of the plurality of photodetection units UC to supply, to the signal processor 24C, the count values CO1 to CO14 generated by each of the plurality of photodetection units UC ((Q) of FIG. 19). Thereafter, the count values CO1 to CO14 in the counters CNT1 to CNT14 are reset.

The signal processor 24C calculates estimated count values CR1 to CR16 in the plurality of unit periods P1A in the detection period P1B on the basis of the count values CO1 to CO14 to calculate the light reception timing of the reflected light pulse L1.

FIGS. 20 and 21 illustrate a relationship among the count values CO1 to CO14, the count value CN1 to CN16, and the estimated count values CR1 to CR16.

The estimated count values CR1 to CR16 are count values in the respective unit periods P1A on the assumption that the count value CO14 includes only an ambient light component. The estimated count value CR1 is an accumulation of count values in the first unit period P1A in the detection period P1B, as with the count value CN1. The estimated count value CR2 is an accumulation of count values in the second unit period P1A in the detection period P1B, as with the count value CN2. The same applies to the estimated count values CR3 to CR16.

In a case where the count value CO14 includes only an ambient light component, each of the estimated count value CR14 to CR16 is estimated to be ⅓ of the count value CO14. Accordingly, an estimated count value α in FIG. 20 is estimated to be ⅓ of the count value CO14, and an estimated count value β is estimated to be ⅔ of the count value CO14. The signal processor 24C is able to calculate the estimated count values CR1 to CR16 with use of the estimated count values α and β.

In other words, for example, the sum of the count values CO2, CO5, CO8, CO11, and CO14 is subtracted from the sum of the count values CO1, CO4, CO7, CO1, and CO13, and the estimated count value α, thereby making it possible to obtain the estimated count value CR1. In addition, for example, the sum of the count values CO3, CO6, CO9, and CO12, and the estimated count value β is subtracted from the sum of the count values CO2, CO5, CO8, CO11, and CO14, thereby making it possible to obtain the estimated count value CR2. In addition, for example, the sum of the count values CO4, CO7, CO10, and CO13, and the estimated count value α is subtracted from the sum of the count values CO3, CO6, CO9, and CO12, and the estimated count value β, thereby making it possible to obtain the estimated count value CR3. The same applies to the estimated count values CR4 to CR13. In FIG. 21, the estimated count values CR1 to CR6 are represented using the count values CO1 to CO14 and the estimated count values α and β, and represented using the count values CN1 to CN16. It is assumed that the count value CO14 includes only an ambient light component; therefore, it is expected that a second term is zero in equations representing the estimated count values CR1 to CR6 with use of the count values CN1 to CN16.

Thus, in a case where the count value CO14 includes only an ambient light component, the signal processor 24C is able to calculate the estimated count values CR1 to CR16 by such a calculation on the basis of the count values CO1 to CO14. In FIG. 19, in a case where an end timing of the reflected light pulse L1 is earlier than the timing of a rising edge of the control signal EN14, the count value CO14 includes only an ambient light component. Accordingly, for example, in a case where a distance to the detection object OBJ has been estimated to some extent in advance and the end timing of the reflected light pulse L1 is earlier than the timing of the rising edge of the control signal EN14, the signal processor 24C is able to calculate the estimated count values CR1 to CR16 by such a calculation on the basis of the count values CO1 to CO14.

It is to be noted that in this example, it is assumed that the count value CO14 includes only an ambient light component, but this is not limitative. It may be assumed that the count value CO1 includes only an ambient light component. In this case, each of the estimated count values CR1 to CR3 is estimated to be ⅓ of the count value CO1. Accordingly, as illustrated in FIG. 22, the estimated count value α is estimated to be ⅓ of the count value CO1, and the estimated count value β is estimated to be ⅔ of the count value CO1. The signal processor 24C is able to calculate the estimated count values CR1 to CR16 with use of the estimated count values α and β, as illustrated in FIG. 23. For example, in a case where a distance to the detection object OBJ has been estimated to some extent in advance and a start timing of the reflected light pulse L1 is later than the timing of a falling edge of the control signal EN1, the signal processor 24C is able to calculate the estimated count values CR1 to CR16 by such a calculation on the basis of the count values CO1 to CO14.

In addition, for example, the signal processor 24C may specify the count value CO including only an ambient light component of the count values CO1 to CO14 on the basis of the count values CO1 to CO14. For example, in a case where the count value CO14 includes only an ambient light component, the signal processor 24C is able to calculate the estimated count values CR1 to CR16 on the basis of the count values CO1 to CO14 with use of a method illustrated in FIGS. 20 and 21. In addition, for example, in a case where the count value CO1 includes only an ambient light component, the signal processor 24C is able to calculate the estimated count values CR1 to CR16 on the basis of the count values CO1 to CO14 with use of a method illustrated in FIGS. 22 and 23.

In addition, in the photodetection system 1C according to the present modification example, the operation in the detection period P1B is performed individually a plurality of times, but this is not limitative. As with the embodiment described above (FIG. 6), the operation in the detection period P1B may be continuously repeated.

Modification Example 4

In the photodetection system 1C according to Modification Example 3 described above, on the assumption that the count value CO14 includes only an ambient light component, the estimated count values α and β are calculated on the basis of the count value CO14, but this is not limitative. A counter dedicated to detection of ambient light may be provided, and the estimated count values α and β may be calculated on the basis of a count value of this counter. A photodetection system 1D according to the present modification example is described in detail below.

The photodetection system 1D according to the present modification example includes a photodetector 20D, as with the photodetection system 1 (FIG. 1) according to the embodiment described above. The photodetector 20D includes a signal generator 30D, a photodetection array 21D, a readout controller 23D, and a signal processor 24D, as with the photodetector 20 (FIG. 2) according to the embodiment described above.

The signal generator 30D is configured to generate fourteen control signals EN1 to EN14 and a control signal ENB and supply the generated control signal EN1 to EN14 and ENB to the photodetection array 21D.

The photodetection array 21D includes a plurality of photodetection units UD disposed in a matrix.

FIG. 24 illustrates a configuration example of the photodetection unit UD. The photodetection unit UD includes a switch SWB and a counter CNTB.

The switch SWB is configured to turn on or off supply of the pulse signal PLS to the counter CNTB on the basis of the control signal ENB.

The counter CNTB is configured to increment a count value COB by performing count processing on the basis of a rising edge of the pulse signal PLS supplied from the switch SWB.

The readout controller 23D is configured to control an operation of supplying, to the signal processor 24D, the count values CO1 to CO14 and COB generated in each of the plurality of photodetection units UD in the photodetection array 21D, on the basis of an instruction from the photodetection controller 25.

The signal processor 24D is configured to detect, on the basis of the count values CO1 to CO14 and COB supplied from each of the plurality of photodetection units UD in the photodetection array 21D, the light reception timing of the reflected light pulse L1 in that photodetection unit UD. The signal processor 24D then generates a distance image by measuring time (TOF value) from emission of the light pulse L0 by the light-emitting section 11 to detection of the reflected light pulse L1 by the photodetection unit UD.

FIG. 25 illustrates an operation example of the photodetection system 1D. (A) indicates a waveform of light emitted from the light-emitting section 11. (B) indicates a waveform of light reflected by the detection object OBJ and having entered a certain photodetection unit U. (C) to (P) respectively indicate waveforms of the control signals EN1 to EN14. (Q) indicates a waveform of the control signal ENB. (R) indicates an operation of the readout controller 23C.

The signal generator 30D changes the control signal ENB to the high level in a period (ambient light detection period P1D) from a timing t90 to a timing t91 before the light-emitting section 11 emits the light pulse L0 ((Q) of FIG. 25). The length of the ambient light detection period P1D is a length corresponding to six unit periods P1A in this example. The switch SWB is turned on in the period from the timing t90 to the timing t91 on the basis of the control signal ENB to supply the pulse signal PLS to the counter CNTB. The counter CNTB performs count processing on the basis of a rising edge of the pulse signal PLS supplied from the switch SWB in this period from the timing t90 to the timing t91 to increment the count value COB.

This ambient light detection period P1D is a period before the light-emitting section 11 emits the light pulse L0; therefore, the count value COB includes only an ambient light component. Accordingly, the estimated count value α according to Modification Example 3 described above is estimated to be ⅙ of the count value COB, and the estimated count value β according to Modification Example 3 describe above is estimated to be ⅓ of the count value COB. Thus, increasing the length of the ambient light detection period P1D makes it possible to enhance accuracy of the estimated count values α and β.

The photodetection unit UD individually repeats such an operation in a period (the ambient light detection period P1D and the detection period P1B) from the timing t90 to the timing t107 in the exposure period P1 at small time intervals.

Then, in the period (readout period P2) from the timing t108 to the timing t109, the readout controller 23D performs readout control CR, thereby controlling the operations of the plurality of photodetection units UD to supply, to the signal processor 24D, the count values CO1 to CO14, and COB generated by each of the plurality of photodetection units UD ((R) of FIG. 25). Thereafter, the count values CO1 to CO14 and COB in the counters CNT1 to CNT14 and CNTB are reset.

The signal processor 24D calculates the estimated count values α and β on the basis of the count value COB, and calculates the count values CR1 to CR16 in the plurality of unit periods P1A in the detection period P1B on the basis of the count values CO1 to CO14 and the estimated count values α and β to calculate the light reception timing of the reflected light pulse L1, as with the signal processor 24C.

Modification Example 5

In the photodetection system 1C according to Modification Example 3 described above, fourteen counters CNT are provided in the photodetection unit UC, but this is not limitative. Thirteen or less counters CNT may be provided, or fifteen or more counters CNT may be provided. An example in which where four counters CNT are provided is described in detail below.

A photodetection system 1E according to the present modification example includes a photodetector 20E, as with the photodetection system 1 (FIG. 1) according to the embodiment described above. The photodetector 20E includes a signal generator 30E, a photodetection array 21E, a readout controller 23E, and a signal processor 24E, as with the photodetector 20 (FIG. 2) according to the embodiment described above.

The signal generator 30E is configured to generate four control signals EN1 to EN4 and supply the generated control signals EN1 to EN4 to the photodetection array 21E.

The photodetection array 21E includes a plurality of photodetection units UE disposed in a matrix.

FIG. 26 illustrates a configuration example of the photodetection unit UE. The photodetection unit UB includes the light-receiving section DET, four switches SW (switches SW1 to SW4), and four counters CNT (counters CNT1 to CNT4).

The switch SW1 is configured to turn on or off supply of the pulse signal PLS to the counter CNT1 on the basis of the control signal EN1. The same applies to the switches SW2 to SW4.

The counter CNT1 is configured to increment the count value CO1 by performing count processing on the basis of a rising edge of the pulse signal PLS supplied from the switch SW1. The same applies to the counters CNT2 to CNT4.

The readout controller 23E is configured to control an operation of supplying, to the signal processor 24E, the count values CO1 to CO4 generated in each of the plurality of photodetection units UE in the photodetection array 21E, on the basis of an instruction from the photodetection controller 25.

The signal processor 24E is configured to detect, on the basis of the count values CO1 to CO4 supplied from each of the plurality of photodetection units UE in the photodetection array 21E, the light reception timing of the reflected light pulse L1 in that photodetection unit UE. The signal processor 24E then generates a distance image by measuring time (TOF value) from emission of the light pulse L0 by the light-emitting section 11 to detection of the reflected light pulse L1 by the photodetection unit UB.

FIG. 27 illustrates an operation example of the photodetection system 1E. (A) indicates a waveform of light emitted from the light-emitting section 11. (B) indicates a waveform of light reflected by the detection object OBJ and having entered a certain photodetection unit U. (C) to (F) respectively indicate waveforms of the control signals EN1 to EN4. (G) to (J) respectively indicate waveforms of the count values CO1 to CO4. (S) indicates an operation of the readout controller 23E.

In this example, in a period (exposure period P1) from a timing till to a timing t123, the photodetection system 1E repeatedly emits the light pulse L0, and repeatedly detects the reflected light pulse L1 reflected by the detection object OBJ.

Specifically, in a period from the timing t11 to a timing t112, the light-emitting section 11 emits light ((A) of FIG. 27).

The signal generator 30E changes the control signal EN1 to the high level in a period from the timing t111 to a timing t113 ((C) of FIG. 27). The length of a period (pulse period P1C) in which the control signal EN1 is at the high level is a length corresponding to two unit periods P1A. Likewise, the signal generator 30E changes the control signal EN2 to the high level in a period from the timing t112 to a timing t114, changes the control signal EN3 to the high level in a period from the timing t113 to a timing t115, and changes the control signal EN4 to the high level in a period from the timing t114 to a timing t116 ((D) of FIG. 27 to (F) of FIG. 27). Thus, the signal generator 30E generates the control signals EN1 to EN4 to sequentially shift periods (pulse periods P1C) in which the control signals EN1 to EN4 are at the high level by the unit period P1A.

In this example, the reflected light pulse L1 is generated at a position across the timing t73 ((B) of FIG. 27).

The switch SW1 is turned on in the period from the timing t111 to the timing t113 on the basis of the control signal EN1 to supply the pulse signal PLS to the counter CNT1. In this period from the timing t111 to the timing t113, the counter CNT1 performs count processing on the basis of a rising edge of the pulse signal PLS supplied from the switch SW1 to increment the count value CO1 ((C) and (G) of FIG. 27). The same applies to the switches SW2 to SW4 and the counters CNT2 to CNT4.

The photodetection unit UE repeats such an operation in a period (detection period P1B) from the timing t111 to the timing t115. Accordingly, in a plurality of periods (e.g., the period from the timing t111 to the timing t113, a period from the tithing t115 to the timing t117, a period from a tithing t119 to a timing t121, and the like) in which the control signal EN1 is at the high level, the counter CNT1 performs count processing to generate the count value CO1. The same applies to the counters CNT2 to CNT4.

Then, in a period (readout period P2) from a timing t124 to a timing t125, the readout controller 23E performs readout control CR, thereby controlling the operations of the plurality of photodetection units UE to supply, to the signal processor 24E, the count values CO1 to CO4 generated by each of the plurality of photodetection units UE ((K) of FIG. 27). Thereafter, the count values CO1 to CO4 in the counters CNT1 to CNT4 are reset.

The signal processor 24E calculates the estimated count values CR1 to CR4 in the plurality of unit periods P1A in the detection period P1B on the basis of the count values CO1 to CO4 to calculate the light reception timing of the reflected light pulse L1.

FIGS. 28 and 29 illustrate a relationship among the count values CO1 to CO4, the count values CN1 to CN4, and the estimated count values CR1 to CR4.

The estimated count values CR1 to CR4 are count values in the respective unit periods P1A on the assumption that the count value CO4 includes only an ambient light component.

In a case where the count value CO4 includes only an ambient light component, each of the estimated count values CR14 to CR1 and CR4 is estimated to be ½ of the count value CO4. Accordingly, the estimated count value α in FIG. 28 is estimated to be ½ of the count value CO4. The signal processor 24E is able to calculate the estimated count values CR1 to CR4 with use of this estimated count value α. For example, in a case where a distance to the detection object OBJ has been estimated to some extent in advance, the start timing of the reflected light pulse L1 is later than the timing of a falling edge of the control signal EN4, and the end timing of the reflected light pulse L1 is earlier than the timing of the rising edge of the control signal EN14, the signal processor 24E is able to calculate the estimated count values CR1 to CR4 by such a calculation on the basis of the count values CO1 to CO14.

Modification Example 6

In the embodiment described above, as illustrated in FIGS. 4A and 4B, the light-receiving section DET includes one photodiode PD, but this is not limitative. Instead of this, for example, as illustrated in FIGS. 30A and 30B, the light-receiving section DET may include a plurality of photodiodes PD (four photodiodes PD1 to PD4 in this example). The photodiodes PD1 to PD4 are coupled in parallel to each other, and the photodiodes PD1 to PD4 each have an anode supplied with the power supply voltage VSS, and a cathode coupled to the node N1. It is to be noted that, in this example, the photodiodes PD are provided, but this is not limitative. For example, three or less or five or more photodiodes PD may be provided. This makes it possible to enhance, for example, light reception accuracy in the light-receiving section DET.

Modification Example 7

In the embodiment described above, as illustrated in FIG. 3, the photodetection unit U includes one light-receiving section DET, but this is not limitative. Instead of this, for example, as illustrated in FIG. 31, a plurality of light-receiving sections DET may be included. Such a photodetection unit UF includes a plurality of light-receiving sections DET (four light-receiving sections DET1 to DET4 in this example), and a logical OR circuit OR1. The light-receiving sections DET1 to DET4 each generate a pulse signal. The plurality of light-receiving sections DET each have, for example, a circuit configuration illustrated in FIG. 4A or a circuit configuration illustrated in FIG. 4B. It is to be noted that, in this example, four light-receiving sections DET are provided, but this is not limitative. For example, three or less or five or more light-receiving sections DET may be provided. The logical OR circuit OR1 is configured to generate the pulse signal PLS by finding logical OR of the pulse signals generated by the four light-receiving sections DET1 to DET4. This make sit possible to enhance, for example, light reception accuracy in the photodetection unit UF.

Modification Example 8

The photodetector 20 according to the embodiment described above may be formed on one semiconductor substrate, or may be formed on a plurality of semiconductor substrates. The present modification example is described in detail below with reference to an example in which the photodetector 20 is formed on two semiconductor substrates.

FIG. 32 illustrates an implementation example of the photodetector 20. In this example, the photodetector 20 is formed on two semiconductor substrates 101 and 102. The semiconductor substrate 101 is disposed on side of the light-receiving surface S of the photodetector 20, and the semiconductor substrate 102 is disposed on side opposite to the light-receiving surface S of the photodetector 20. The semiconductor substrates 101 and 102 are superimposed on each other. A wiring line of the semiconductor substrate 101 and a wiring line of the semiconductor substrate 102 are coupled to each other by a wiring line 103. It is possible to use, for example, metallic bonding such as Cu—Cu bonding or bump bonding for the wiring line 103. The photodetection units U are disposed over these two semiconductor substrates 101 and 102.

FIG. 33 illustrates a configuration example of the light-receiving section DET in the photodetection unit U. This light-receiving section DET has the same circuit configuration as the light-receiving section DET illustrated in FIG. 4A. In this example, the light-receiving section DET is disposed over the two semiconductor substrates 101 and 102. Specifically, the photodiode PD is disposed on the semiconductor substrate 101, and the resistor R1 and the inverter IV1 are disposed on the semiconductor substrate 102. The photodiode PD has the cathode coupled to the other end of the resistor R1 and an input terminal of the inverter IV1 through the wiring line 103. Here, in the inverter IV1, it is to be noted that in this example, the present modification example is applied to the photodetector 20 including the light-receiving section DET illustrated in FIG. 4A; however, the present modification example may be applied to the photodetector 20 including the light-receiving section DET illustrated in FIG. 4B in a similar manner.

The switches SW1 to SW8 and the counters CNT1 to CNT8 in the photodetection unit U are disposed on the semiconductor substrate 102. A region where the switches SW1 to SW8 and the counters CNT1 to CNT8 are formed of the semiconductor substrate 102 is a region disposed at a position corresponding to a region where the photodiode PD is formed of the semiconductor substrate 101. Specifically, the region where the switches SW1 to SW8 and the counters CNT1 to CNT8 are formed of the semiconductor substrate 102 is disposed directly below the region where the photodiode PD is formed of the semiconductor substrate 101.

For example, in a case where four photodiodes PD are provided in the photodetection unit U, such as a case where four photodiodes PD are provided in the light-receiving section DET as illustrated in FIGS. 30A and 30D or a case where four light-receiving sections DET are provided as illustrated in FIG. 31, these four photodiodes PD are disposed on, for example, the semiconductor substrate 101, and the switches SW1 to SW8 and the counters CNT1 to CNT8 are disposed on, for example, the semiconductor substrate 102, as illustrated in FIG. 34. Likewise, for example, in a case where nine photodiodes PD are provided in the photodetection unit U as illustrated in FIG. 35, these nine photodiode PD are provided on, for example, the semiconductor substrate 101, and the switches SW1 to SW8 and the counters CNT1 to CNT8 are disposed on, for example, the semiconductor substrate 102.

OTHER MODIFICATION EXAMPLES

Two or more of these modification examples may be combined.

<2. Example of Application to Mobile Body>

The technology (the present technology) according to the present disclosure is applicable to a variety of products. For example, the technology according to the present disclosure may be achieved as a device mounted on any type of mobile body such as an automobile, an electric vehicle, a hybrid electric vehicle, a motorcycle, a bicycle, a personal mobility, an airplane, a drone, a vessel, or a robot.

FIG. 36 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 36, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 36, an audio speaker 12061, a display section 12062, and an instrument panel 12063 are illustrated as the output device. The display section 12062 may, for example, include at least one of an on-board display and a head-up display.

FIG. 37 is a diagram depicting an example of the installation position of the imaging section 12031.

In FIG. 37, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 37 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The example of the vehicle control system to which the technology according to the present disclosure may be applied has been described above. The technology according to the present disclosure may be applied to the imaging section 12031 among the components described above. This makes it possible to enhance detection accuracy of time (TOF value) or a distance in the vehicle control system 12000. As a result, this allows the vehicle control system 12000 to implement, with high accuracy, collision avoidance or shock mitigation for vehicles, a following driving function based on vehicle-to-vehicle distance, a vehicle speed maintaining driving function, a warning function of collision of the vehicle, a warning function of deviation of the vehicle from a lane, and the like.

Although the present technology has been described above with reference to some embodiments, the modification examples, and specific application examples thereof, the present technology is not limited to these embodiments and the like, and may be modified in a variety of ways.

For example, in the respective embodiments described above, the light-receiving section DET as illustrated in FIG. 4A or 4B is provided; however, the circuit configuration of the light-receiving section DET is not limited thereto, and any of various circuit configurations is applicable to the light-receiving section DET.

It is to be noted that the effects described herein are merely illustrative and non-limiting, and other effects may be included.

It is to be noted that the present technology may have the following configurations. According to the present technology having the following configurations, it is possible to enhance detection accuracy.

(1)

A photodetection device including:

- a light-receiving section that includes a light-receiving element, and generates a pulse signal including a pulse corresponding to a result of light reception by the light-receiving element;
- a plurality of switches that is each turned on or off on the basis of a corresponding control signal of a plurality of control signals, and each transmits the pulse signal by being turned on in a pulse period of the corresponding control signal of the plurality of control signals;
- a plurality of counters that is provided corresponding to the plurality of switches, and each performs counting processing on the basis of the pulse signal supplied through a corresponding switch of the plurality of switches to generate a first count value; and
- a signal generator that generates the plurality of control signals in a detection period to sequentially shift the respective pulse periods of the plurality of control signals by a unit period having a shorter time length than the pulse period.

(2)

The photodetection device according to (1), in which the respective pulse periods of the plurality of control signals are equal to each other.

(3)

The photodetection device according to (1) or (2), in which the time length of the pulse period is an integer multiple of the time length of the unit period.

(4)

The photodetection device according to any one of (1) to (3), in which the light-receiving section detects a light pulse in a period except for first one or more unit periods in the detection period.

(5)

The photodetection device according to any one of (1) to (4), in which the light-receiving section detects a light pulse in a period except for last one or more unit periods in the detection period.

(6)

The photodetection device according to any one of (1) to (5), further including a processor that calculates a second count value in each of a plurality of the unit periods on the basis of the respective first count values of the plurality of counters to calculate a light detection timing.

(7)

The photodetection device according to (6), in which

- a first switch of the plurality of switches is turned on, on the basis of a first control signal of the plurality of control signals, the pulse period of the first control signal being first set in the detection period, and
- the processor performs division of the first count value of a first counter corresponding to the first switch of the plurality of counters by number of the unit periods included in the pulse period, and calculates the second count value on the basis of a result of the division.

(8)

The photodetection device according to (6), in which a second switch of the plurality of switches is turned on, on the basis of a second control signal of the plurality of control signals, the pulse period of the second control signal being last set in the detection period, and the processor performs division of the first count value of a second counter corresponding to the second switch of the plurality of counters by number of the unit periods included in the pulse period, and calculates the second count value on the basis of a result of the division.

(9)

The photodetection device according to (6), in which a first switch of the plurality of switches is turned on, on the basis of a first control signal of the plurality of control signals, the pulse period of the first control signal being first set in the detection period, a second switch of the plurality of switches is turned on, on the basis of a second control signal of the plurality of control signals, the pulse period of the second control signal being last set in the detection period, and one of the first count value of a first counter corresponding to the first switch of the plurality of counters, and the first count value of a second counter corresponding to the second switch of the plurality of counters is selected on the basis of the respective first count values of the plurality of counters, division of the selected first count value by number of the unit periods included in the pulse period is performed, and the second count value is calculated on the basis of a result of the division.

(10)

The photodetection device according to any one of (1) to (9), in which the light-receiving element includes a single photon avalanche diode.

(11)

The photodetection device according to any one of (1) to (9), in which the light-receiving element includes an avalanche photodiode.

(12)

The photodetection device according to any one of (1) to (11), in which a plurality of photodetection units is provided, and each of the plurality of photodetection units includes the light-receiving section, the plurality of switches, and the plurality of counters.

(13)

The photodetection device according to (12), in which the light-receiving element is provided on a first semiconductor substrate, and the light-receiving section, the plurality of switches, and the plurality of counters are provided on a second semiconductor substrate bonded to the first semiconductor substrate.

(14)

The photodetection device according to (13), in which the light-receiving element is provided in a first region of the first semiconductor substrate, and the light-receiving section, the plurality of switches, and the plurality of counters are provided in a second region of the second semiconductor substrate, the second region being disposed at a position corresponding to the first region.

(15)

A photodetection system including:

a light-emitting section that emits light; and a photodetector that detects light reflected by a detection object of the light emitted from the light-emitting section, in which the photodetector includes a light-receiving section that includes a light-receiving element, and generates a pulse signal including a pulse corresponding to a result of light reception by the light-receiving element, a plurality of switches that is each turned on or off on the basis of a corresponding control signal of a plurality of control signals, and each transmits the pulse signal by being turned on in a pulse period of the corresponding control signal of the plurality of control signals, a plurality of counters that is provided corresponding to the plurality of switches, and each performs counting processing on the basis of the pulse signal supplied through a corresponding switch of the plurality of switches to generate a first count value, and a signal generator that generates the plurality of control signals in a detection period to sequentially shift the respective pulse periods of the plurality of control signals by a unit period having a shorter time length than the pulse period.

This application claims the priority on the basis of Japanese Patent Application No. 2021-005817 filed on Jan. 18, 2021 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A photodetection device comprising:

a light-receiving section that includes a light-receiving element, and generates a pulse signal including a pulse corresponding to a result of light reception by the light-receiving element;

a plurality of switches that is each turned on or off on a basis of a corresponding control signal of a plurality of control signals, and each transmits the pulse signal by being turned on in a pulse period of the corresponding control signal of the plurality of control signals;

a plurality of counters that is provided corresponding to the plurality of switches, and each performs counting processing on a basis of the pulse signal supplied through a corresponding switch of the plurality of switches to generate a first count value; and a signal generator that generates the plurality of control signals in a detection period to sequentially shift the pulse period of the corresponding control signal of the plurality of control signals by a unit period having a shorter time length than the pulse period.

2. The photodetection device according to claim 1, wherein the respective pulse periods of the plurality of control signals are equal to each other.

3. The photodetection device according to claim 1, wherein a time length of the pulse period is an integer multiple of the shorter time length of the unit period.

4. The photodetection device according to claim 1, wherein the light-receiving section detects a light pulse in a period except for first one or more unit periods in the detection period.

5. The photodetection device according to claim 1, wherein the light-receiving section detects a light pulse in a period except for last one or more unit periods in the detection period.

6. The photodetection device according to claim 1, further comprising a processor that calculates a second count value in each of a plurality of the unit periods on a basis of the respective first count values of the plurality of counters to calculate a light detection timing.

7. The photodetection device according to claim 6, wherein a first switch of the plurality of switches is turned on, on a basis of a first control signal of the plurality of control signals, the pulse period of the first control signal being first set in the detection period, and the processor performs division of the first count value of a first counter corresponding to the first switch of the plurality of counters by number of the unit periods included in the pulse period, and calculates the second count value on a basis of a result of the division.

8. The photodetection device according to claim 6, wherein a second switch of the plurality of switches is turned on, on a basis of a second control signal of the plurality of control signals, the pulse period of the second control signal being last set in the detection period, and the processor performs division of the first count value of a second counter corresponding to the second switch of the plurality of counters by number of the unit periods included in the pulse period, and calculates the second count value on a basis of a result of the division.

9. The photodetection device according to claim 6, wherein a first switch of the plurality of switches is turned on, on a basis of a first control signal of the plurality of control signals, the pulse period of the first control signal being first set in the detection period, a second switch of the plurality of switches is turned on, on a basis of a second control signal of the plurality of control signals, the pulse period of the second control signal being last set in the detection period, and one of the first count value of a first counter corresponding to the first switch of the plurality of counters, and the first count value of a second counter corresponding to the second switch of the plurality of counters is selected on a basis of the respective first count values of the plurality of counters, division of the selected first count value by number of the unit periods included in the pulse period is performed, and the second count value is calculated on a basis of a result of the division.

10. The photodetection device according to claim 1, wherein the light-receiving element includes a single photon avalanche diode.

11. The photodetection device according to claim 1, wherein the light-receiving element includes an avalanche photodiode.

12. The photodetection device according to claim 1, wherein a plurality of photodetection units is provided, and each of the plurality of photodetection units includes the light-receiving section, the plurality of switches, and the plurality of counters.

13. The photodetection device according to claim 12, wherein the light-receiving element is provided on a first semiconductor substrate, and the light-receiving section, the plurality of switches, and the plurality of counters are provided on a second semiconductor substrate bonded to the first semiconductor substrate.

14. The photodetection device according to claim 13, wherein the light-receiving element is provided in a first region of the first semiconductor substrate, and the light-receiving section, the plurality of switches, and the plurality of counters are provided in a second region of the second semiconductor substrate, the second region being disposed at a position corresponding to the first region.

15. A photodetection system comprising:

a light-emitting section that emits light; and a photodetector that detects light reflected by a detection object of the light emitted from the light-emitting section, wherein the photodetector includes a light-receiving section that includes a light-receiving element, and generates a pulse signal including a pulse corresponding to a result of light reception by the light-receiving element, a plurality of switches that is each turned on or off on a basis of a corresponding control signal of a plurality of control signals, and each transmits the pulse signal by being turned on in a pulse period of the corresponding control signal of the plurality of control signals, a plurality of counters that is provided corresponding to the plurality of switches, and each performs counting processing on a basis of the pulse signal supplied through a corresponding switch of the plurality of switches to generate a first count value, and a signal generator that generates the plurality of control signals in a detection period to sequentially shift the pulse period of the corresponding control signal of the plurality of control signals by a unit period having a shorter time length than the pulse period.

* * * * *